United States Patent
Shor et al.

(10) Patent No.: US 12,555,683 B2
(45) Date of Patent: Feb. 17, 2026

(54) EEG P-ADIC QUANTUM POTENTIAL IN NEURO-PSYCHIATRIC DISEASES

(71) Applicants: Ramot at Tel-Aviv University Ltd., Tel-Aviv (IL); Mor Research Applications Ltd., Ramat Gan (IL)

(72) Inventors: Oded Shor, Tel-Aviv (IL); Felix Benninger, Ramat Gan (IL); Andrei Khrennikov, Tel-Aviv (IL)

(73) Assignees: Ramot at Tel-Aviv University Ltd., Tel-Aviv (IL); Mor Research Applications Ltd., Ramat Gan (IL)

( * ) Notice: Subject to any disclaimer, the term of this patent is extended or adjusted under 35 U.S.C. 154(b) by 0 days.

(21) Appl. No.: 18/027,946

(22) PCT Filed: Sep. 23, 2021

(86) PCT No.: PCT/IL2021/051162
§ 371 (c)(1),
(2) Date: Mar. 23, 2023

(87) PCT Pub. No.: WO2022/064501
PCT Pub. Date: Mar. 31, 2022

(65) Prior Publication Data
US 2023/0368916 A1    Nov. 16, 2023

Related U.S. Application Data

(60) Provisional application No. 63/082,492, filed on Sep. 24, 2020.

(51) Int. Cl.
G16H 50/20    (2018.01)
A61B 5/00    (2006.01)
(Continued)

(52) U.S. Cl.
CPC .............. *G16H 50/20* (2018.01); *A61B 5/372* (2021.01); *A61B 5/7235* (2013.01); *A61B 5/165* (2013.01); *A61B 5/4088* (2013.01)

(58) Field of Classification Search
None
See application file for complete search history.

(56) References Cited

U.S. PATENT DOCUMENTS

| | | | |
|---|---|---|---|
| 2004/0171960 A1* | 9/2004 | Musha | A61B 5/369 600/409 |
| 2010/0168603 A1 | 7/2010 | Himes et al. | |

(Continued)

FOREIGN PATENT DOCUMENTS

| | | |
|---|---|---|
| CN | 110945597 | 3/2020 |
| WO | WO 2022/064501 | 3/2022 |

OTHER PUBLICATIONS

Murtagh, "Data Science Foundations: Geometry and Topology of Complex Hierarchic systems and Big Data Analysis", published 2017, CRC Press (Year: 2017).*

(Continued)

*Primary Examiner* — Jason M Sims
*Assistant Examiner* — Matthew Eric Ogles

(57) ABSTRACT

There is provided a computer implemented method of diagnosing a medical state associated with a neuro-psychiatric disorder in a subject, comprising: receiving a plurality of EEG datasets, each respective EEG dataset from a respective EEG electrode of a plurality of EEG electrodes monitoring a head of the subject, clustering the plurality of EEG datasets into a plurality of clusters, computing a p-adic representation of the plurality of clusters, extracting a quantum potential value from p-adic representation of the plurality of clusters, and diagnosing the medical state associated with the neuro-psychiatric disorder according to the (Continued)

quantum potential relative to a threshold that separates between presence of the medical state and non-presence of the medical state.

13 Claims, 17 Drawing Sheets

(51) Int. Cl.
 *A61B 5/16* (2006.01)
 *A61B 5/372* (2021.01)

(56) References Cited

U.S. PATENT DOCUMENTS

| | | | |
|---|---|---|---|
| 2015/0282755 A1 | 10/2015 | Deriche et al. | |
| 2016/0228028 A1* | 8/2016 | Van Der Kooi | A61B 5/165 |
| 2016/0306942 A1 | 10/2016 | Rapaka et al. | |
| 2018/0279938 A1* | 10/2018 | Yoo | G16H 50/20 |
| 2018/0345006 A1* | 12/2018 | Ambrose | A61B 5/0536 |
| 2019/0059762 A1* | 2/2019 | Starr | G16H 40/63 |
| 2019/0269348 A1* | 9/2019 | Medvedovsky | A61B 5/7235 |
| 2020/0205711 A1 | 7/2020 | Laszlo et al. | |
| 2020/0237247 A1* | 7/2020 | Glik | A61B 5/4088 |

OTHER PUBLICATIONS

Holland, "Computing the wavefunction from trajectories: particle and wave pictures in quantum mechanics and their relation" published Feb. 2005, Science Direct, pp. 1-23 (Year: 2005).*

Ageev, "Coleman-Weinberg potential in p-adic field theory" published Sep. 18, 2020, Semantic Scholar, pp. 1-23, published Sep. 18, 2020 (Year: 2020).*

Supplementary European Search Report and the European Search Opinion Dated Dec. 21, 2023 From the European Patent Office Re. Application No. Dec. 21, 2023. (6 Pages).

Albeverio et al. "Memory Retrieval as a P-adic Dynamical System", BioSystems 49: 105-115, Feb. 1, 1999.

International Preliminary Report on Patentability Dated Apr. 6, 2023 From the International Bureau of WIPO Re. Application No. PCT/IL2021/051162. (5 Pages).

International Search Report and the Written Opinion Dated Jan. 11, 2022 From the International Searching Authority Re. Application No. PCT/IL2021/051162. (9 Pages).

Acharya et al. "Computer-Aided Diagnosis of Depression Using EEG Signals", European Neurology, 73(5-6): 329-336, Jun. 2015.

Ageev et al. "Coleman-Weinberg Potential in P-adic Field Theory", The European Physical Journal C, 80(9): 1-10, Published Online Sep. 18, 2020.

Amezquita-Sanchez et al. "A Novel Methodology for Automated Differential Diagnosis of Mild Cognitive Impairment and the Alheimer's Disease Using EEG Signals", Journal of Neuroscience Methods, 322: 88-95, Available Online May 2, 2019.

Arns et al. "Quantitative EEG (QEEG) in Psychiatry: Diagnostic or Prognostic Use?", Clinical Neurophysiology, 125(8): 1504-1506, Published Online Feb. 1, 2014.

Baradits et al. "Biological Motion Processing in Patients With Schizophrenia: A High-Density EEG Event Related Potential Study", European Psychiatry, Oral Communications, 56S: S564, # OC-0001, 2019.

Birur et al. "Brain Structure, Function, and Neurochemistry in Schizophrenia and Bipolar Disorder—A Systematic Review of the Magnetic Resonance Neuroimaging Literature", NPJ Schizophrenia, 3: 15-1-15-15, Published Online Apr. 3, 2017.

Briels et al. "In Pursuit of A Sensitive EEG Functional Connectivity Outcome Measure for Clinical Trials in Alzheimer's Disease", Clinical Neurophysiology, 131(1): 88-95, Published Online Nov. 4, 2019.

Collins et al. "Grand Challenges in Global Mental Health: Integration in Research, Policy, and Practice", PLOS Medicine, 10(4): e1001434-1-e1001434-6, Published Online Apr. 30, 2013.

Conte et al. "Mental States Follow Quantum Mechanics During Perception and Cognition of Ambiguous Figures", Open Systems & Information Dynamics, 16(1):85-100, Mar. 2009.

Cretin et al. "Epileptic Prodromal Alzheimer's Disease, a Retrospective Study of 13 New Cases: Expanding the Spectrum of Alzheimer's Disease to an Epileptic Variant?", Journal of Alzheimer's Disease, 52(3): 1125-1133, Apr. 18, 2016.

Endres et al. "Atom-by-Atom Assembly of Defect-Free One-Dimensional Cold Atom Arrays", Science, 354(6315): 1024-1028, Nov. 25, 2016.

Endres et al. "Valence and Conduction Band Densities of States of Metal Halide Perovskites: A Combined Experimental-Theoretical Study", The Journal of Physical Chemistry Letters, 7(14): 2722-2729, Published Online Jul. 1, 2016.

Erkkinnen et al. "Clinical Neurology and Epidemiology of the Major Neurodegenerative Diseases", Cold Spring Harbor Perspectives in Biology, 10(4): a033118-1-a033118-45, Apr. 2018.

Fang et al. "Genomic Prediction of Depression Risk and Resilience Under Stress", Nature Human Behaviour, 4(1): 111-118, Published Online Oct. 28, 2019.

Holland "The Individed Universe: An Ontological Interpretation of Quantum Theory: Fringe Physics", Nature, 366(6454): 420, Dec. 2, 1993.

Jennum et al. "The Social and Economic Consequences of Epilepsy: A Controlled National Study", Epilepsia, 52(5): 949-956, Published Online Jan. 28, 2011.

Kennis et al. "Prospective Biomarkers of Major Depressive Disorder: A Systematic Review and Meta-Analysis", Molecular Psychiatry, 25(2): 321-338, Published Online Nov. 19, 2019.

Keynejad et al. "WHO Mental Health Gap Action Programme (MhGAP) Intervention Guide: A Systematic Review of Evidence From Low and Middle-Income Countries", Evidence-Based Mental Health, 21(1): 30-34, Published Online Sep. 13, 2017.

Khoury et al. "Diagnostic Biomarkers of Alzheimer's Disease: A State-of-the Art Review", Biomarkers in Neuropsychiatry, 1: 100005-1-100005-6, Dec. 1, 2019.

Kitchen Andren et al. "Population Base Rates and Disease Course of Common Psychiatric and Neurodegenerative Disorders", Neuropsychology Review, 27(3): 284-301, Published Online Sep. 22, 2017.

Lebedeva et al. "MRI-Based Classification Models in Prediction of Mild Cognitive Impairment and Dementia in Late-Life Depression", Frontiers in Aging Neuroscience, 9(Art.13): 1-11, Published Online Feb. 2, 2017.

Liedorp et al. "Prevalence and Clinical Significance of Epileptiform EEG Discharges in a Large Memory Clinic Cohort", Dementia and Geriatric Cognitive Disorders, 29(5): 432-437, Published Online May 26, 2010.

Livingston et al. "Dementia Prevention, Intervention, and Care", The Lancet, 390(10113): 2673-2734, Published Online Jul. 20, 2017.

Malhi et al. "Depression", The Lancet, 392(10161): 2299-2312, Published Online Nov. 2, 2018.

Maran et al. "Electrophysiological Insights Into Connectivity Anomalies in Schizophrenia: A Systematic Review", Neuropsychiatric Electrophysiology, 2(1): 6-1-6-9, Dec. 2016.

Mehta et al. "Why Do Trials for Alzheimer's Disease Drug Keep Failing? A Discontinued Drug Perspective for 2010-2015", Expert Opinion on Investigational Drugs, 26(6): 735-739, Published Online May 2, 2017.

Michel et al. "EEG Microstates as a Tool for Studying the Temporal Dynamics of Whole-Brain Neuronal Networks: A Review", NeuroImage, 180(Pt.B): 577-593, Available Online Dec. 2, 2017.

Newson et al. "EEG Frequency Bands in Psychiatric Disorders: A Review of Resting State Studies", Frontiers in Human Neuroscience, 12(Art.521): 1-24, Published Online Jan. 9, 2019.

Noebels "A Perfect Storm: Convering Paths of Epilepsy and Alzheimer's Dementia Intersect in the Hippocampal Formation", Epilepsia, 52(Suppl.1): 39-46, Jan. 2011.

Oh et al. "Deep Concolutional Neural Network Model for Automated Diagnosis of Schizophrenia Using EEG Signals", Applied Sciences, 9(14): 2870-1-2870-13, Jan. 2019.

(56) References Cited

OTHER PUBLICATIONS

Owen et al. "Schizophrenia", The Lancet, Seminar, 388(10039): p. 86-P97, Published Online Jan. 14, 2016.
Palop et al. "Epilepsy and Cognitive Impairments in Alzheimer Disease", Archives of Neurology, 66(4): 435-440, Apr. 2009.
Panza et al. "A Critical Appraisal of Amyloid-Beta-Targeting Therapies for Alzheimer Disease", Natue Reviews Neurology, 15(2): 73-88, Feb. 2019.
Shor et al. "EEG P-adic Quantum Potential Accurately Identifies Depression, Schizophrenia and Cognitive Decline", PLos One, 16(8): 12 pages, Aug. 5, 2021.
Smailovic et al. "Neurophysiological Markers of Alzheimer's Disease: Quantitative EEG Approach", Neurology and Therapy, 8(Suppl. 2): S37-S55, Published Online Dec. 12, 2019.
Staffaroni et al. "Neuroimaging in Dementia", Serminars in Neurology, 37(5): 510-537, Oct. 2017.
Strawbridge et al. "Biomarkers for Depression: Recent Insights, Current Challenges and Future Prospects", Neuropsychiatric Disease and Treatment, 13: 1245-1262, Published Online May 10, 2017.
Sun et al. "Understanding of COVID-19 Based on Current Evidence", Journal of Medical Virology, 92(6): 548-551, Published Online Mar. 5, 2020.
Tait et al. "Final Analysis of a Trial of M72/AS01E Vaccine to Prevent Tuberculosis", The New England Journal of Medicine, 381(25): 2429-2439, Dec. 19, 2019.
Vossel et al. "Seizures and Epileptiform Activity in the Early Stages of Alzheimer's Disease", JAMA Neurology, 70(9): 1158-1166, Sep. 1, 2013.
Wade et al. "Using Electroencephalography for Treatment Guidance in Major Depressive Disorder", Biological Psychiatry: Cognitive Neuroscience and Neuroimaging, 1(5): 411-422, Published Online Jun. 9, 2016.
Wang et al. "The AME2016 Atomic Mass Evaluation. II. Tables, Graphs and References", Chinese Physics C, 41(3): 030003-1-030003-442, Mar. 2017. (Part 1).
Wang et al. "The AME2016 Atomic Mass Evaluation. II. Tables, Graphs and References", Chinese Physics C, 41(3): 030003-1-030003-442, Mar. 2017. (Part 2).
Wittchen et al. "The Size and Burden of Mental Disorders and Other Disorders of the Brain in Europe 2010", European Neuropsychopharmacology, 21(9): 655-679, Sep. 2011.
Wu et al. "Multi-Robot Path Deconfliction Through Prioritization by Path Prospects", 2020 IEEE International Conference on Robotics and Automation, ICRA, Paris, France, May 31-Aug. 31, 2020, p. 9809-9815, May 31, 2020.
Wu et al. "Myosin-Va Is Required for Preciliary Vesicle Transportation to the Mother Centriole During Ciliogenesis", Nature Cell Biology, 20(2): 175-185, Published Online Jan. 15, 2018.
Yiannopoulou et al. "Reasons for Failed Trials of Disease-Modifying Treatments for Alzheimer Disease and Their Contribution in Recent Research", Biomedicines, 7(4): 97-1-97-16, Published Online Dec. 9, 2019.
Zetterberg et al. "Blood-Based Moelcular Biomarkers for Alzheimer's Disease", Molecular Brain, 12(1): 26-1-26-7, Mar. 28, 2019.
Zhuo et al. "Long Noncoding RNA GMAN, Up-Regulated in Gastric Cancer Tissues, Is Associated With Metastasis in Patients and Promotes Translation of Ephrin A1 by Competitively Binding GMAN-AS", Gastroenterology, 156(3): 676-691, Published Online Nov. 13, 2018.

\* cited by examiner

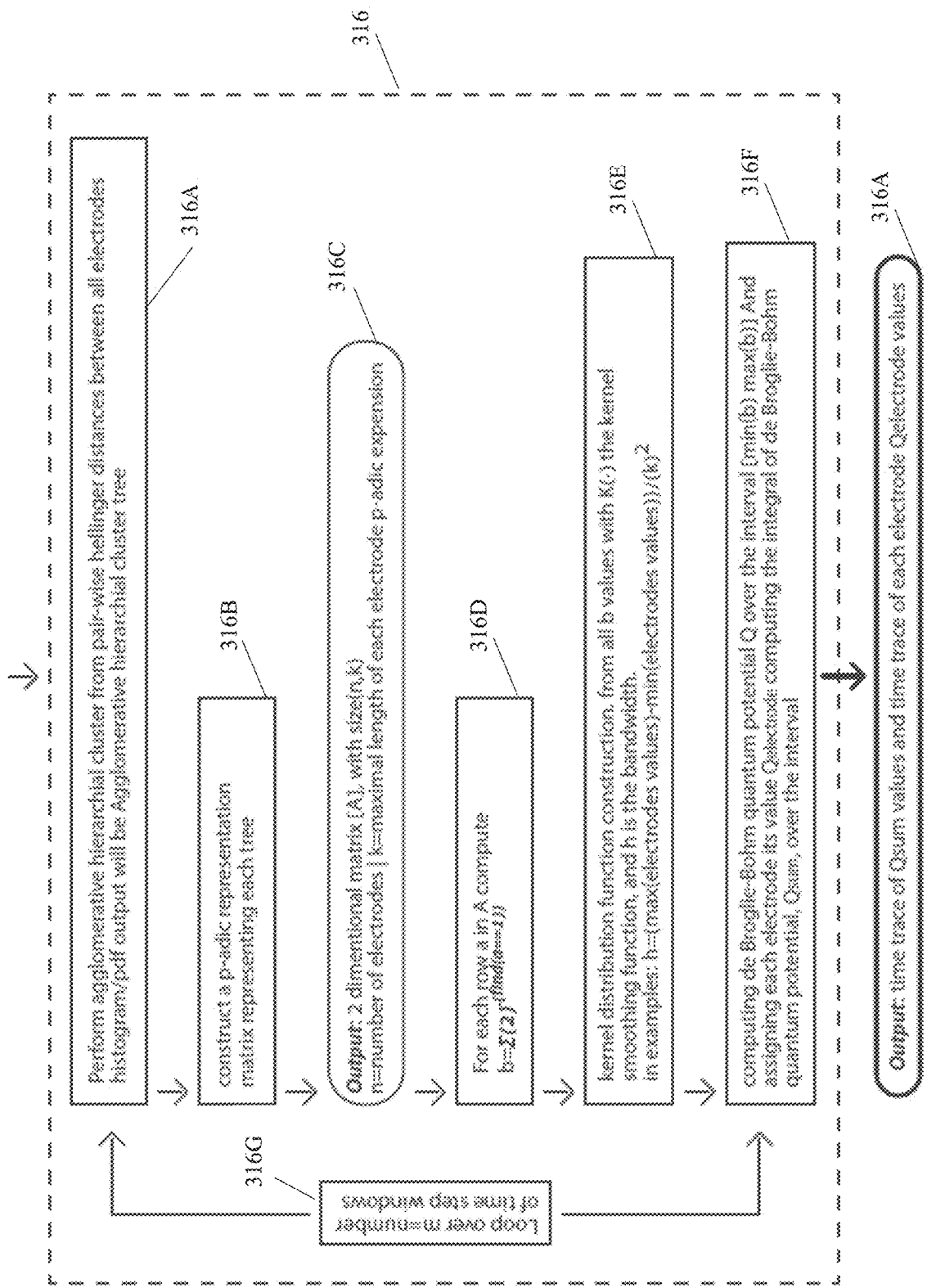
FIG. 3A - continued

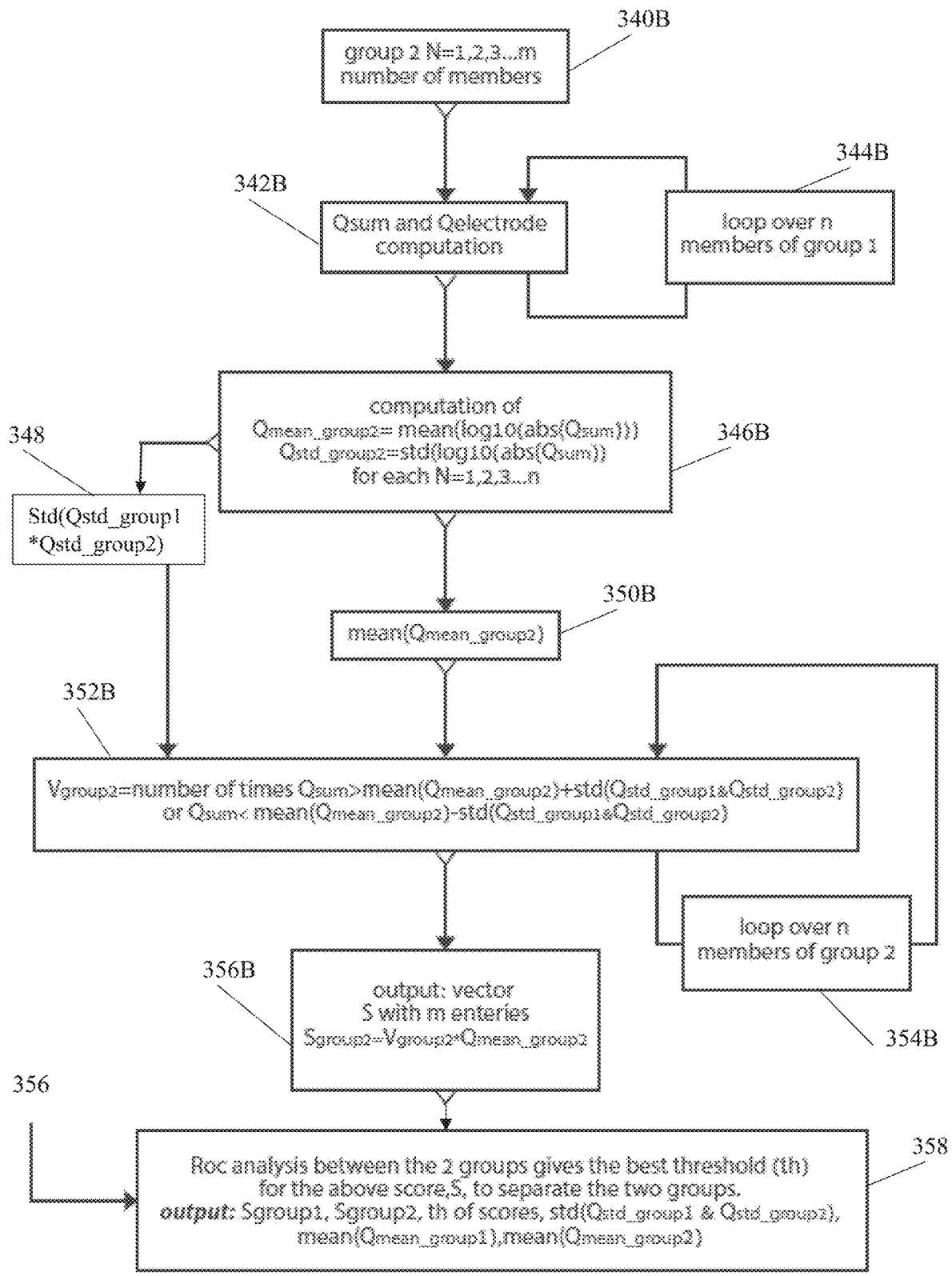
FIG. 3B - continued

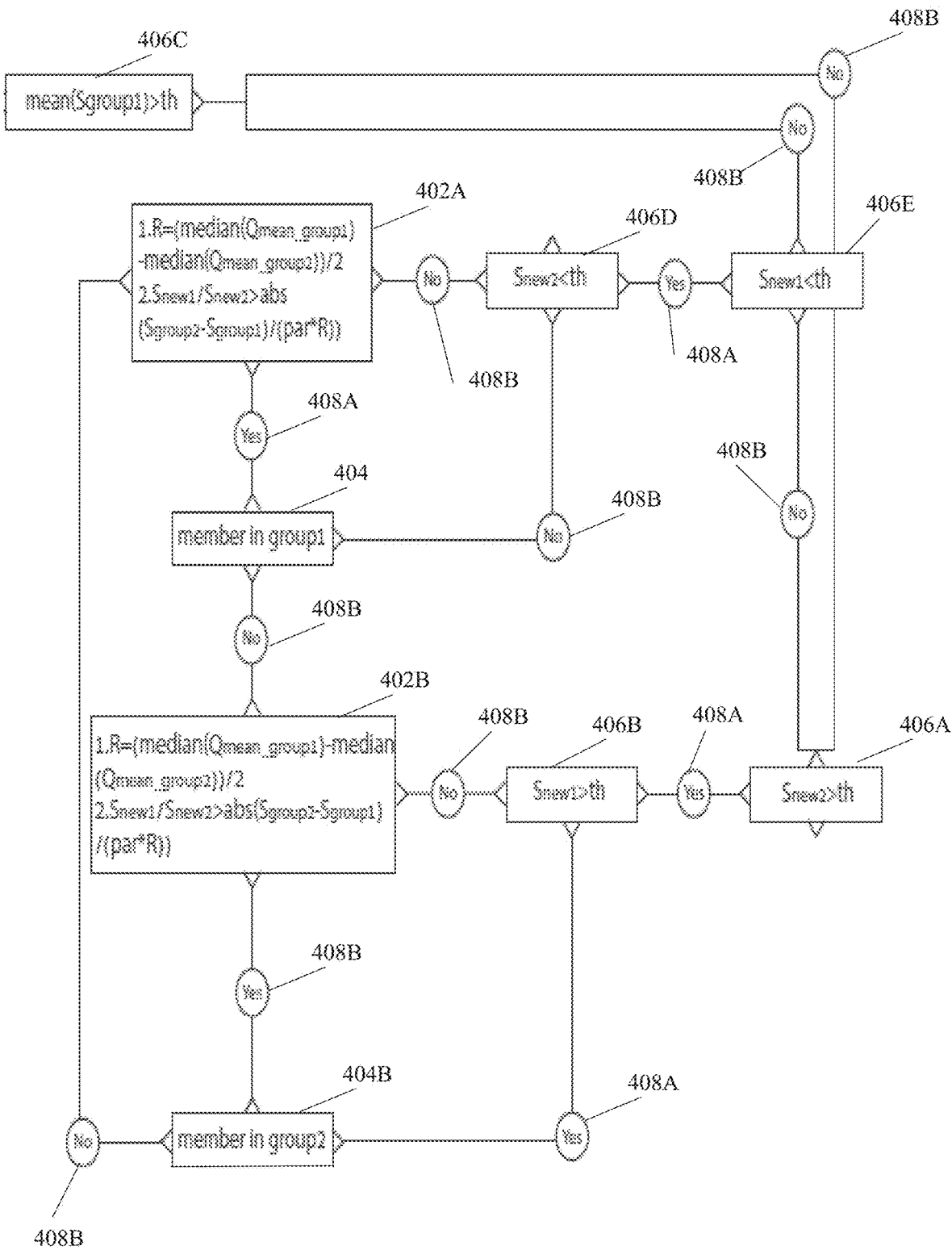
FIG. 3C - continued

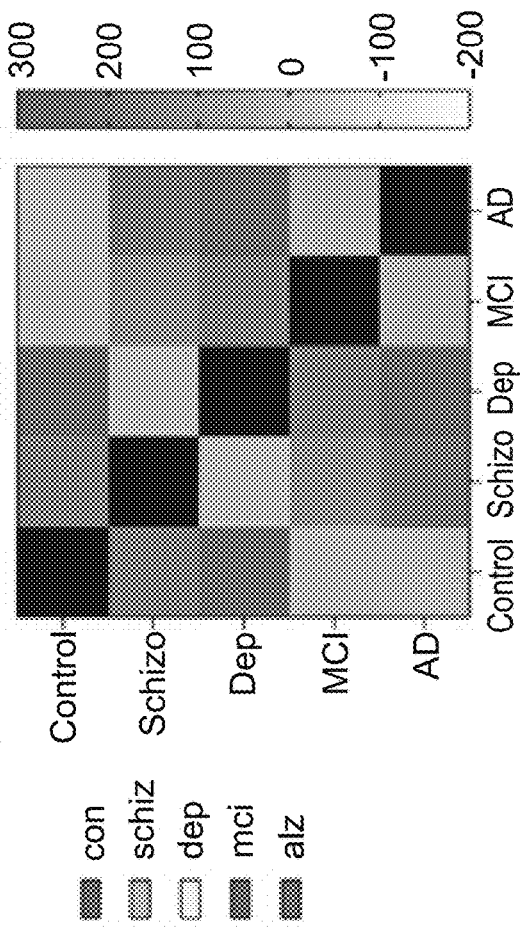
FIG. 4B
FIG. 4E
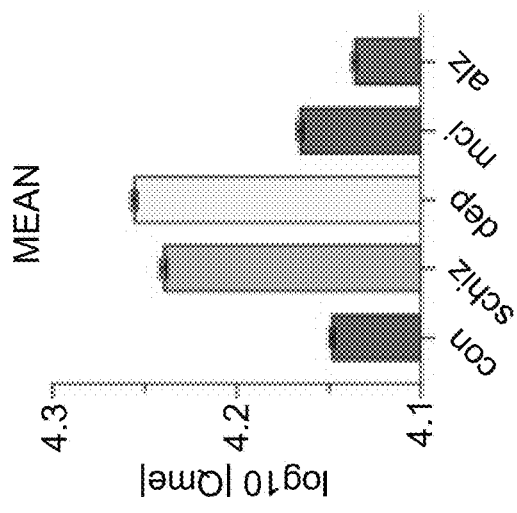
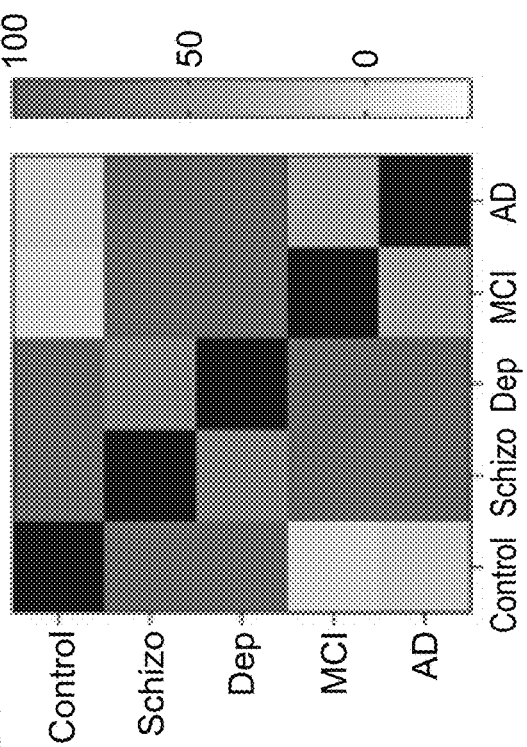
FIG. 4D
FIG. 4F
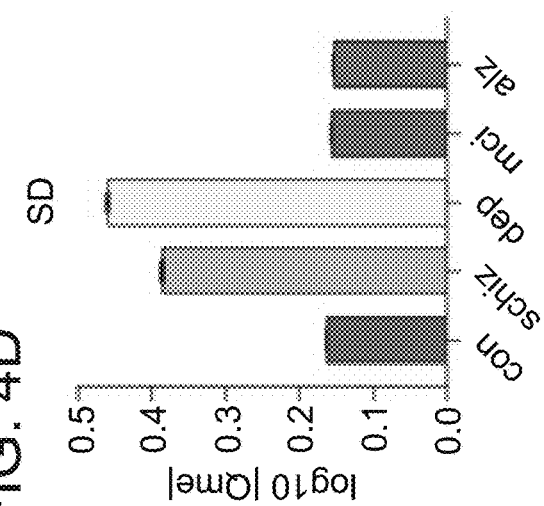

EEG P-ADIC QUANTUM POTENTIAL IN NEURO-PSYCHIATRIC DISEASES

RELATED APPLICATIONS

This application is a National Phase of PCT Patent Application No. PCT/IL2021/051162 having International filing date of Sep. 23, 2021, which claims the benefit of priority under 35 USC § 119(e) of U.S. Provisional Patent Application No. 63/082,492 filed on Sep. 24, 2020. The contents of the above applications are all incorporated by reference as if fully set forth herein in their entirety.

FIELD AND BACKGROUND OF THE INVENTION

The present invention, in some embodiments thereof, relates to diagnosing neuro-psychiatric diseases and, more specifically, but not exclusively, to systems and methods for diagnosing neuro-psychiatric diseases using EEG data.

Disorders of the brain like schizophrenia, epilepsy, depression, dementia and other mental and neurological disorders constitute about 27% of the global disease burden (disability-adjusted life-years, DALYs) surpassing cardiovascular diseases and cancer combined (Kitchen Andren, Gabel, Stelmokas, Rich, & Bieliauskas, 2017, incorporated herein by reference in its entirety). As the general population ages, the burden of brain disorders increases (EBC, 2017; Feigin et al., 2017, incorporated herein by reference in its entirety) however many brain diseases show an early-onset in life and, due to their chronic course, have an enormous health and socio-economic impact (Andersson et al., 2020; Erkkinen, Kim, & Geschwind, 2018; Jennum, Gyllenborg, & Kjellberg, 2011; Livingston et al., 2017; Wittchen et al., 2011, incorporated herein by reference in its entirety). The consequences extend well beyond the healthcare system: loss of healthy life years and quality of life, burdens on health and social welfare systems, implications for labor markets with prolonged impairment, great dependency and significant reduced productivity. The absence of cures and the lack of pre-symptomatic diagnosis and possible preventive interventions makes disorders of the brain the greatest global challenge for health and social care in the 21st century (Malhi & Mann, 2018; Owen, Sawa, & Mortensen, 2016, incorporated herein by reference in its entirety).

SUMMARY OF THE INVENTION

According to a first aspect, a computer implemented method of diagnosing a medical state associated with a neuro-psychiatric disorder in a subject, comprising: receiving a plurality of EEG datasets, each respective EEG dataset from a respective EEG electrode of a plurality of EEG electrodes monitoring a head of the subject, clustering the plurality of EEG datasets into a plurality of clusters, computing a p-adic representation of the plurality of clusters, extracting a quantum potential value from p-adic representation of the plurality of clusters, and diagnosing the medical state associated with the neuro-psychiatric disorder according to the quantum potential relative to a threshold that separates between presence of the medical state and non-presence of the medical state.

According to a second aspect, a system for diagnosing a medical state associated with a neuro-psychiatric disorder in a subject, comprises: at least one hardware processor executing a code for: receiving a plurality of EEG datasets, each respective EEG dataset from a respective EEG electrode of a plurality of EEG electrodes monitoring a head of the subject, clustering the plurality of EEG datasets into a plurality of clusters, computing a p-adic representation of the plurality of clusters, and extracting a quantum potential value from p-adic representation of the plurality of clusters, wherein the medical state associated with the neuro-psychiatric disorder is diagnosed according to the quantum potential relative to a threshold that separates between presence of the medical state and non-presence of the medical state.

According to a third aspect, a computer program for diagnosing a medical state associated with a neuro-psychiatric disorder in a subject, comprising program instructions which, when executed by a processor, cause the processor to perform: receiving a plurality of EEG datasets, each respective EEG dataset from a respective EEG electrode of a plurality of EEG electrodes monitoring a head of the subject, clustering the plurality of EEG datasets into a plurality of clusters, computing a p-adic representation of the plurality of clusters, and extracting a quantum potential value from p-adic representation of the plurality of clusters, wherein the medical state associated with the neuro-psychiatric disorder is diagnosed according to the quantum potential relative to a threshold that separates between presence of the medical state and non-presence of the medical state.

In a further implementation form of the first, second, and third aspects, further comprising computing a plurality of probability distribution functions each computed for a respective EEG dataset, wherein clustering comprises clustering the plurality of probability distribution functions, wherein the p-adic representation is computed based on clusters of the probability distribution functions.

In a further implementation form of the first, second, and third aspects, further comprising computing a plurality of similarity values, each respective similarity value indicative of similarity between a respective pair of the plurality of probability distribution functions, wherein clustering comprises computing a hierarchical relationship between the pairs of distribution functions according to the plurality of similarity values, wherein the p-acid representation is computed according to the hierarchical relationship.

In a further implementation form of the first, second, and third aspects, each of the plurality of similarity values comprises a Hellinger distance.

In a further implementation form of the first, second, and third aspects, the hierarchical relationship comprises a dendrogram, and wherein the p-acid representation is computed for each respective route through the dendrogram terminating at an edge corresponding to a certain EEG electrode.

In a further implementation form of the first, second, and third aspects, computing the p-adic representation comprises computing a plurality of p-adic representations each corresponding to one EEG electrode, and wherein extracting the quantum potential value comprises computing a single quantum potential value from the plurality of p-adic representations.

In a further implementation form of the first, second, and third aspects, further comprising: converting the p-adic representation into a rational number, wherein each of a plurality of p-adic representations is converted into a corresponding respective rational number, computing a probability distribution function from the rational number, wherein each of a plurality of probability distribution functions is computed from a corresponding rational number, wherein the quantum potential value is computed from the probability distribution function, wherein each of a plurality of quantum potential values is computed from the corresponding respective probability distribution function.

In a further implementation form of the first, second, and third aspects, each of the plurality of quantum potential values corresponds to one of the plurality of EEG electrodes, and further comprising computing an aggregation of the plurality of quantum potential values to generate an aggregated quantum potential value, wherein the diagnosing the medical state is according to the aggregated quantum potential value.

In a further implementation form of the first, second, and third aspects, aggregating comprises computing a mean of the plurality of quantum potential values corresponding to the plurality of EEG electrodes.

In a further implementation form of the first, second, and third aspects, the extracting a quantum potential value comprises extracting a time series including a plurality of quantum potential values each from a corresponding time interval of a plurality of time intervals during which the EEG datasets are obtained, and further comprising: computing a quantum potential mean and variability score (qpmvs) by aggregating the plurality of quantum potential values of the time series, wherein the diagnosing the medical state is according to the aggregated quantum potential value.

In a further implementation form of the first, second, and third aspects, the threshold that separates between presence of the medical state and non-presence of the medical state is set by: computing a plurality of quantum potential values, each quantum potential value for one of a plurality of subjects associated with an indication of the medical state or an indication of non-presence of the medical state, using respective EEG datasets, and setting the threshold to separate between quantum potential values of subjects associated with the indication of the medical state, and quantum potential values of subjects associated with the indication of non-presence of the medical state.

In a further implementation form of the first, second, and third aspects, p-adic comprises 2-adic.

In a further implementation form of the first, second, and third aspects, further comprising treating the patient using a treatment effective for the medical state.

In a further implementation form of the first, second, and third aspects, the medical state is selected from the group consisting of: depression, schizophrenia, Alzheimer's disease (AD), and mild cognitive impairment (MCI), and the non-presence of the medical state is selected from the group consisting of: no neuro-psychiatric disorder, and another neuro-psychiatric disorder that is different from the medical state.

In a further implementation form of the first, second, and third aspects, the medical state is selected from the group consisting of: stable AD, stable MCI and the non-presence of the medical state is selected from the group consisting of: deteriorating AD, and deteriorating MCI.

In a further implementation form of the first, second, and third aspects, the medical state comprises a prediction of likelihood of developing the neuro-psychiatric disorder in the future, and the non-presence of the medical state comprises a prediction of likelihood of not developing the neuro-psychiatric disorder in the future.

In a further implementation form of the first, second, and third aspects, the medical state comprises a prediction of likelihood of positively clinically significantly responding to a certain treatment for the neuro-psychiatric disorder, and the non-presence of the medical state comprises a prediction of likelihood of no clinically significant response to the certain treatment for the neuro-psychiatric disorder.

In a further implementation form of the first, second, and third aspects, further comprising: computing a first quantum potential value for the subject prior to administration of a certain treatment for the neuro-psychiatric disorder, administering the certain treatment to the subject, computing a second quantum potential value for the subject after the administration of the certain treatment for the neuro-psychiatric disorder, and determining a clinically significant response to the certain treatment when the second quantum potential value is statistically significantly different from the first quantum potential value.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 4A, 4B, 4C, 4D, 4E and 4F includes graphs depicting results of the experiment indicative of P-adic quantum potential (QP) differentiating between neuropsychiatric patient groups, in accordance with some embodiments of the present invention;

DESCRIPTION OF SPECIFIC EMBODIMENTS OF THE INVENTION

Figure 1:
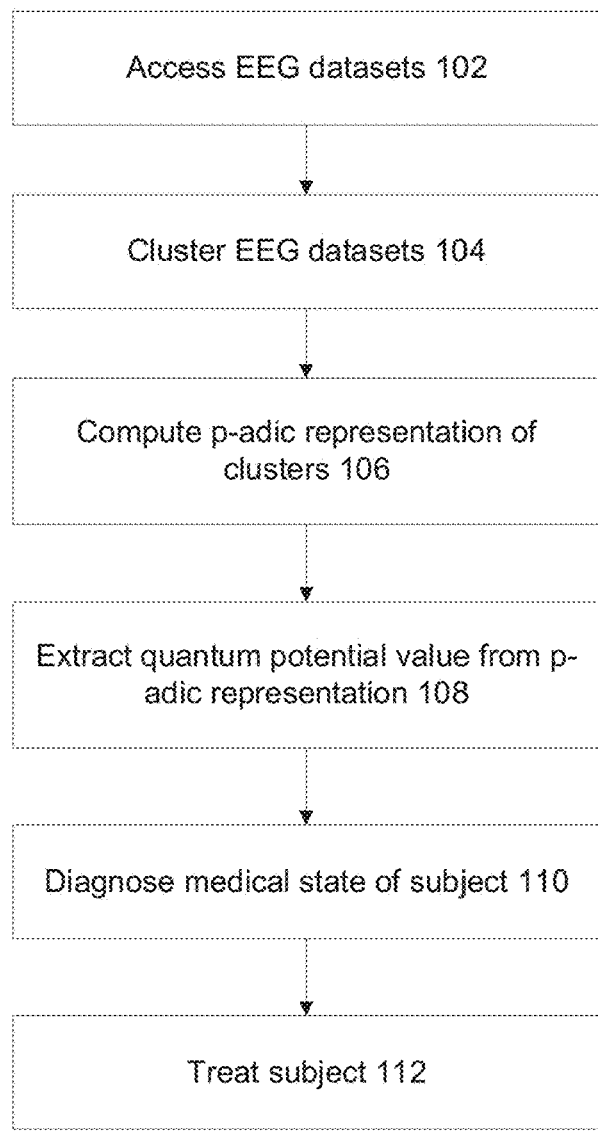
FIG. 1 is a flowchart of a method of computing a quantum potential value extracted from p-adic representation of clusters of EEG datasets obtained from EEG electrodes monitoring a head of a subject, in accordance with some embodiments of the present invention.

The present invention, in some embodiments thereof, relates to diagnosing neuro-psychiatric diseases, predicting disease time course, evaluating treatment outcome and, more specifically, but not exclusively, to systems and methods for diagnosing neuro-psychiatric diseases using EEG data.

An aspect of some embodiments of the present invention relate to systems, methods, an apparatus, and/or code instructions (stored in a memory and executable by one or more hardware processors) for computing a quantum potential value based on EEG datasets sensed by EEG electrodes sensing a head of the subject. The quantum potential value may be used for diagnosing a medical state of the subject, optionally a medical state associated with neuro-psychiatric disorder, by comparing the quantum potential relative to a threshold that separates between presence of the medical state and non-presence of the medical state. The EEG datasets are clustered into multiple clusters. A p-adic representation of the clusters is computed. The quantum potential value is extracted from the p-adic representation of the clusters.

Examples of medical states associated with the neuro-psychiatric disorder in a subject which may be diagnosed using a quantum potential value based on EEG datasets obtained from EEG electrodes monitoring a head of a subject (e.g., by comparing the quantum potential relative to a threshold that separates between presence of the medical state and non-presence of the medical state) include: depression, schizophrenia, anxiety disorder, Alzheimer's disease, mild cognitive impairment, epileptic seizures, differentiating between no neuro-psychiatric condition and the presence of the neuro-psychiatric condition, differentiating between two different neuro-psychiatric conditions, predicting likelihood of developing the neuro-psychiatric disorder in the future (e.g., when no clinically significant symptoms current exist to diagnose the neuro-psychiatric disorder), predicting likelihood of a clinically significant response to a certain treatment administered for treating the neuro-psychiatric disorder, and/or for evaluating response to a certain treatment applied to the patient for treating the neuro-psychiatric disorder.

The neuro-psychiatric disorders described herein are disorders of the brain, including neurological as well psychiatric disorders. Neuro-psychiatric diseases involve the brain, spinal cord and/or the peripheral nervous system and are primarily even though artificially categorized into neurological and psychiatric disorders. The neurological disorders include, for example, one or more of: cerebrovascular diseases (e.g. stroke), central nervous system trauma, seizure disorders and epilepsy, progressive neurodegenerative diseases (e.g. Alzheimer's dementia, Parkinson's disease, Motor Neuron Disease, Huntington's disease), neuroinflammatory diseases (e.g. Multiple sclerosis, systemic lupus erythematosus), central nervous system tumors, infectious diseases of the nervous system, developmental disorders of the CNS including genetic disorders (Down syndrome, Fragile-x, Autism Spectrum disorder), Acquired metabolic disorders of the CNS, diseases of the CNS caused by malnutrition, toxins or drug abuse. The psychiatric disorders, may be categorized according to the ICD-10, for example, including organic, including symptomatic, mental disorders, organic amnesic syndrome, personality and behavioral disorder, mental and behavioral disorders due to psychoactive substance use, schizophrenia, schizotypal and delusional disorders, schizoaffective disorders, mood (affective) disorders (e.g. mania, bipolar and depression), neurotic, stress-related and somatoform disorders (e.g. anxiety disorders), somatoform disorders, eating disorders, personality disorders, intellectual disability.

As used herein, the terms neuro-psychiatric disorder and brain disorder are interchangeable.

As used herein, the terms quantum potential, p-adic quantum potential, and/or quantum potential mean and variability score (qpmvs), are sometimes interchangeable. Although the qpmvs is computed from multiple quantum potential values, as described herein, the terms quantum potential, p-adic quantum potential, and/or qpmvs may sometimes refer to the same biomarker used to diagnose a medical state associated with a neuro-psychiatric disorder in a subject. For example, the quantum potential, p-adic quantum potential, and/or qpmvs may each be compared to a threshold to make the diagnosis, as described herein.

At least some implementations of the systems, methods, apparatus, and/or code instructions described herein address the technical problem and/or medical problem of an objective, repeatable, and/or automated process for diagnosing and/or computing a biomarker indicative of likelihood of a brain disorder in a subject, and/or for determining effectiveness of a treatment for the brain disorder. At least some implementations of the systems, methods, apparatus, and/or code instructions described herein improve the technical field and/or the medical field of diagnosing and/or computing a biomarker indicative of likelihood of a brain disorder in a subject, and/or for determining effectiveness of a treatment for the brain disorder.

For most brain disorders no diagnostic tests nor biomarkers are available and diagnosis is made foremost clinically on the basis of history and examination of the mental state by patient interviews in addition to the assessment of level of consciousness, cognition, mood and the neurologic examination (Livingston et al., 2017; Malhi & Mann, 2018; Owen et al., 2016, incorporated herein by reference in its entirety). While these tools enabled important decisions in relation to diagnosis, the reliance on a subjective assessment approach prone to patient and expert bias raises questions regarding the accuracy of diagnosis. As a consequence, diagnosis is often delayed until an advanced stage of the disease when possible therapeutic interventions are already lacking effect. It has been estimated that 3 to 8 out of 10 people living with a brain disorder remain untreated or inadequately treated (Collins, Insel, Chockalingam, Daar, & Maddox, 2013; Keynejad, Dua, Barbui, & Thornicroft, 2018, incorporated herein by reference in its entirety). Therapy, if available, is focused mainly on symptomatic relieve. Numerous drug trials pursuing disease modifying therapy and cure e.g. in Alzheimer's Disease (AD) have failed over the last decades in great parts due to the absence of biomarkers identifying patients in early stages of the disease and the lack of ability to predict who will develop the disease (Mehta, Jackson, Paul, Shi, & Sabbagh, 2017; Panza, Lozupone, Logroscino, & Imbimbo, 2019; Yiannopoulou, Anastasiou, Zachariou, & Pelidou, 2019, incorporated herein by reference in its entirety). Similar to AD, mental disorders (foremost depression and schizophrenia) are needing biomarkers for predicting and identifying patients as well as forecasting treatment responses to pharmacologic interventions or electro-convulsive therapy (ECT) (Kennis et al., 2020; Levy et al., 2019; Strawbridge, Young, & Cleare, 2017, incorporated herein by reference in its entirety). As one example, the treatment success rate in schizophrenia can be enhanced if patients at risk are identified, psychotic symptoms are detected timely and treatment is initiated in the prodromal phase (Keefe & Reichenberg, 2016; Owen et al., 2016, incorporated herein by reference in its entirety). Identification of people of high risk to develop depression, for example, post traumatic brain injury (TBI), post-trauma, or after major surgery and after giving birth prevention of depression might be an effective strategy (Fang, Scott, Song, Burmeister, & Sen, 2020; W. Wu et al., 2020, incorporated herein by reference in its entirety)

A biomarker is a measurable attribute associated with the clinical status of a patient and can be measured objectively and evaluated as an indicator of normal biologic processes, pathogenic processes or pharmacologic responses to a therapeutic intervention (Biomarkers Definitions Working, 2001). Much research in regard to biomarkers for brain diseases has been focused on biological samples and imaging techniques. This includes serum or cerebrospinal fluid (CSF) samples and several neuroimaging techniques, including magnetic resonance imaging (MRI), blood oxygenation level-dependent (BOLD) functional MRI (fMRI), and positron emission tomography (PET). Not one of the mentioned techniques has been shown to accurately diagnose such heterogenous disorders like AD (Ferreira et al., 2014; Khoury & Ghossoub, 2019; Lebedeva et al., 2017; Ruan et al., 2016; Staffaroni et al., 2017; Wang et al., 2017; Zetterberg & Burnham, 2019), MCI, major depression, or schizophrenia (Birur, Kraguljac, Shelton, & Lahti, 2017; Kennis et al., 2020; Strawbridge et al., 2017; Zhuo et al., 2019, all of which are incorporated herein by reference in their entirety). The choice of biomarker to be used and possibly support the clinical diagnosis is largely dependent on cost and availability (Ward, 2010, incorporated herein by reference in its entirety).

Electroencephalography (EEG) is a non-invasive measure of neuronal electrical activity in the brain recorded non-invasively from electrodes on the scalp. In contrast with other brain imaging methods, EEG has excellent temporal resolution, is non-invasive, of low cost, and currently implemented in healthcare systems around the world due to its current clinical use in helping to diagnose epilepsy (Cervenka & Kaplan, 2016; Smith, 2005, incorporated herein by reference in its entirety). As diagnostic and prognostic marker EEG is currently mainly used in the context of epileptic seizures as a epileptiform abnormalities increase the likelihood of a seizure recurrence significantly (Krumholz, Shinnar, French, Gronseth, & Wiebe, 2015, incorporated herein by reference in its entirety). EEG does play a central role in differentiating primary psychiatric disorders from other brain diseases based on different psychotic syndromes in patients with temporal lobe epilepsy and the high frequency of depression in patients with epilepsy as well as the efficacy of ECT in patients with affective disorders (Endres et al., 2016; Tebartz van Elst et al., 2011; van Elst, 2013, incorporated herein by reference in its entirety). Comparable, the reports of epileptiform activity in patients with dementia sparked an interest of using EEG as diagnostic tool for AD (Lam et al., 2017; Noebels, 2011; Palop & Mucke, 2009, all of which are incorporated herein by reference in their entirety) but subsequent studies demonstrated limited success using epileptiform activity in the EEG to aid with the diagnosis of AD (Cretin et al., 2016; Liedorp, Stam, van der Flier, Pijnenburg, & Scheltens, 2010; Vossel et al., 2013 all of which are incorporated herein by reference in their entirety). For those reasons, focus has shifted in psychiatric and neurocognitive diseases to EEG signature activity like resting state power spectral and functional connectivity analysis as well as microstate analysis. Successes in using those EEG methods in differentiating patients with a confirmed diagnosis of AD (Amezquita-Sanchez, Mammone, Morabito, Marino, & Adeli, 2019; Briels et al., 2020; Michel & Koenig, 2018; Smailovic & Jelic, 2019; Sun et al., 2020; Tait et al., 2019 all of which are incorporated herein by reference in their entirety), Schizophrenia (Baradits et al., 2019; Endres et al., 2016; Maran, Grent-'t-Jong, & Uhlhaas, 2016; Oh, Vicnesh, Ciaccio, Yuvaraj, & Acharya, 2019 all of which are incorporated herein by reference in their entirety), or Depression (Arns & Gordon, 2014; Newson & Thiagarajan, 2018; Olbrich & Arns, 2013; Wade & Iosifescu, 2016; C.-T. Wu et al., 2018 all of which are incorporated herein by reference in their entirety) have been made but the lack of standardization across the research field raises a strong caution to any clinical application of those findings. A promising approach in the use of EEG to predict treatment responses in major depression has been shown by Wu et al. using a machine learning algorithm for resting-state EEG (W. Wu et al., 2020, incorporated herein by reference in its entirety). As most studies used EEGs in a research setting (standardized situations, open and closed eye separation, reduction of artefacts), the clinical value of the approaches is questionable for routine use in regard to screening, diagnosis and prediction.

At least some implementations of the systems, methods, apparatus, and/or code instructions described provide a biomarker, also referred to herein as a quantum potential, p-adic quantum potential, and/or quantum potential mean and variability score (qpmvs), computed from EEG data obtained from EEG electrodes monitoring a head of a subject. The biomarker provides a computed and/or measurable value indicative of likelihood of a medical state associated with a brain disorder.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
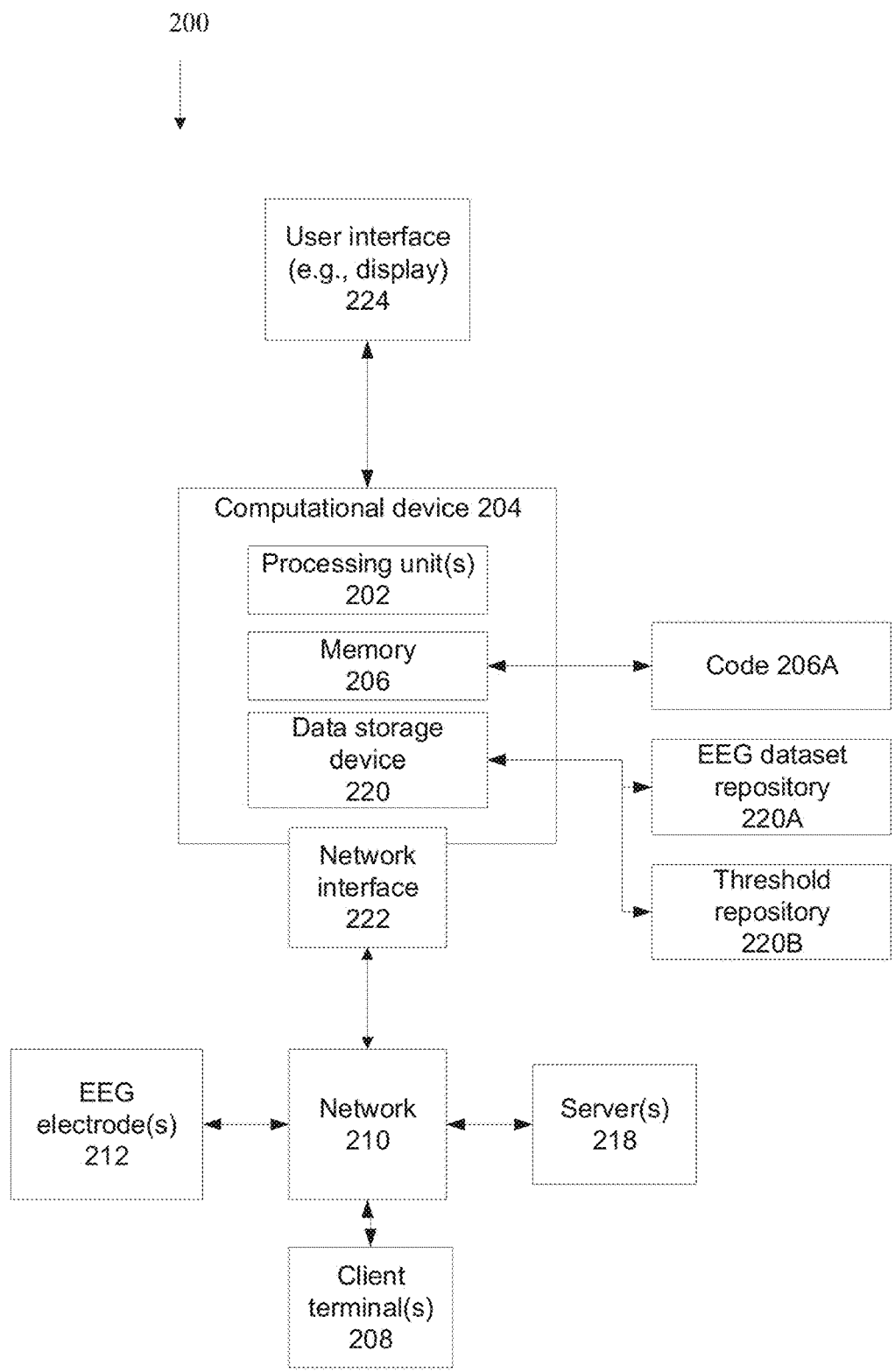
FIG. 2 is a block diagram of a system for computing a quantum potential value extracted from p-adic representation of clusters of EEG datasets obtained from EEG electrodes monitoring a head of a subject, in accordance with some embodiments of the present invention.
Figure 3A:
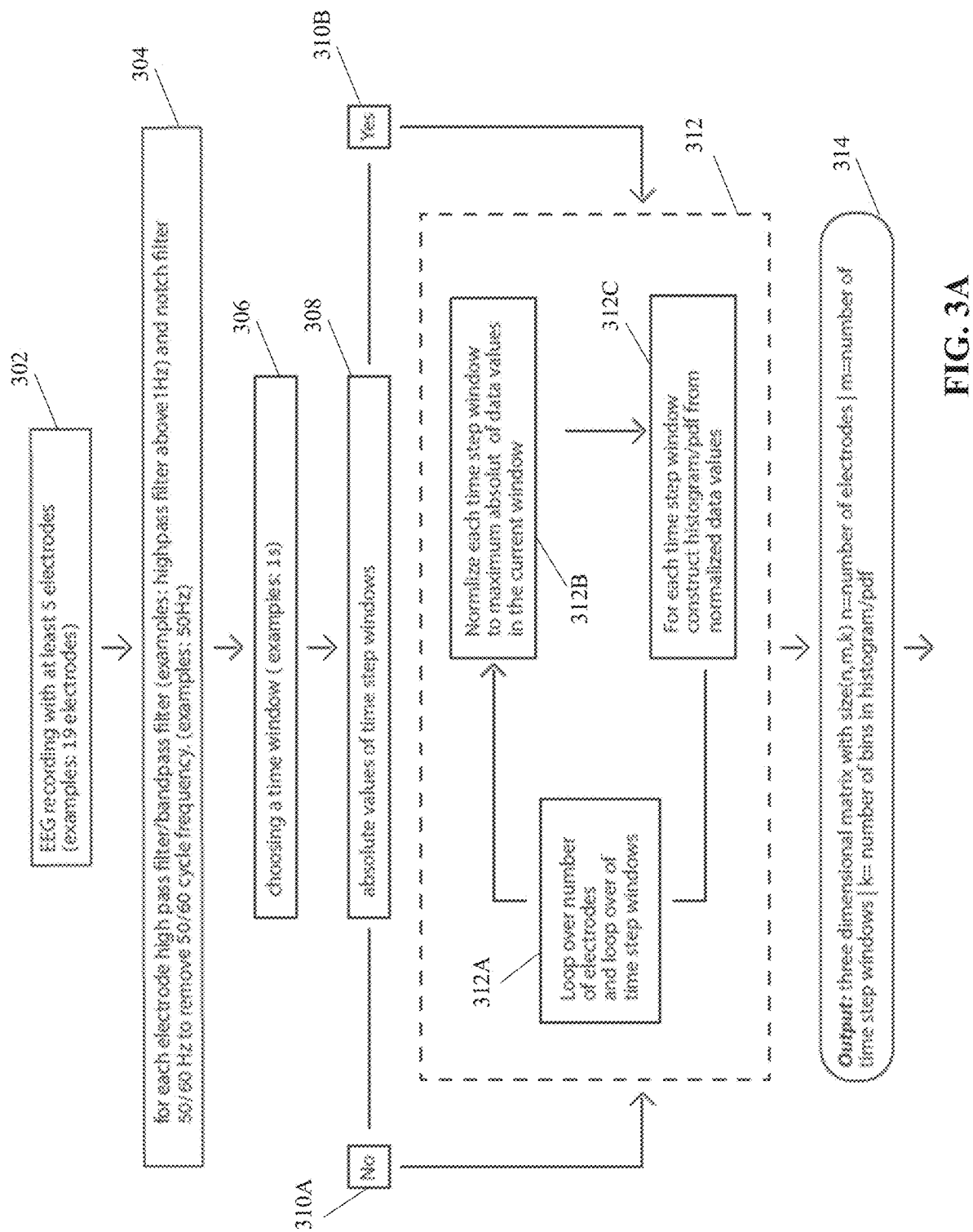
FIGS. 3A, 3B and 3C, which are flowcharts of an exemplary method for quantum potential value from p-adic representation of EEG measurements of a subject, and/or diagnosing the medical state associated with a neuro-psychiatric disorder of the according to the quantum potential, in accordance with some embodiments of the present invention.
Figure 3B:
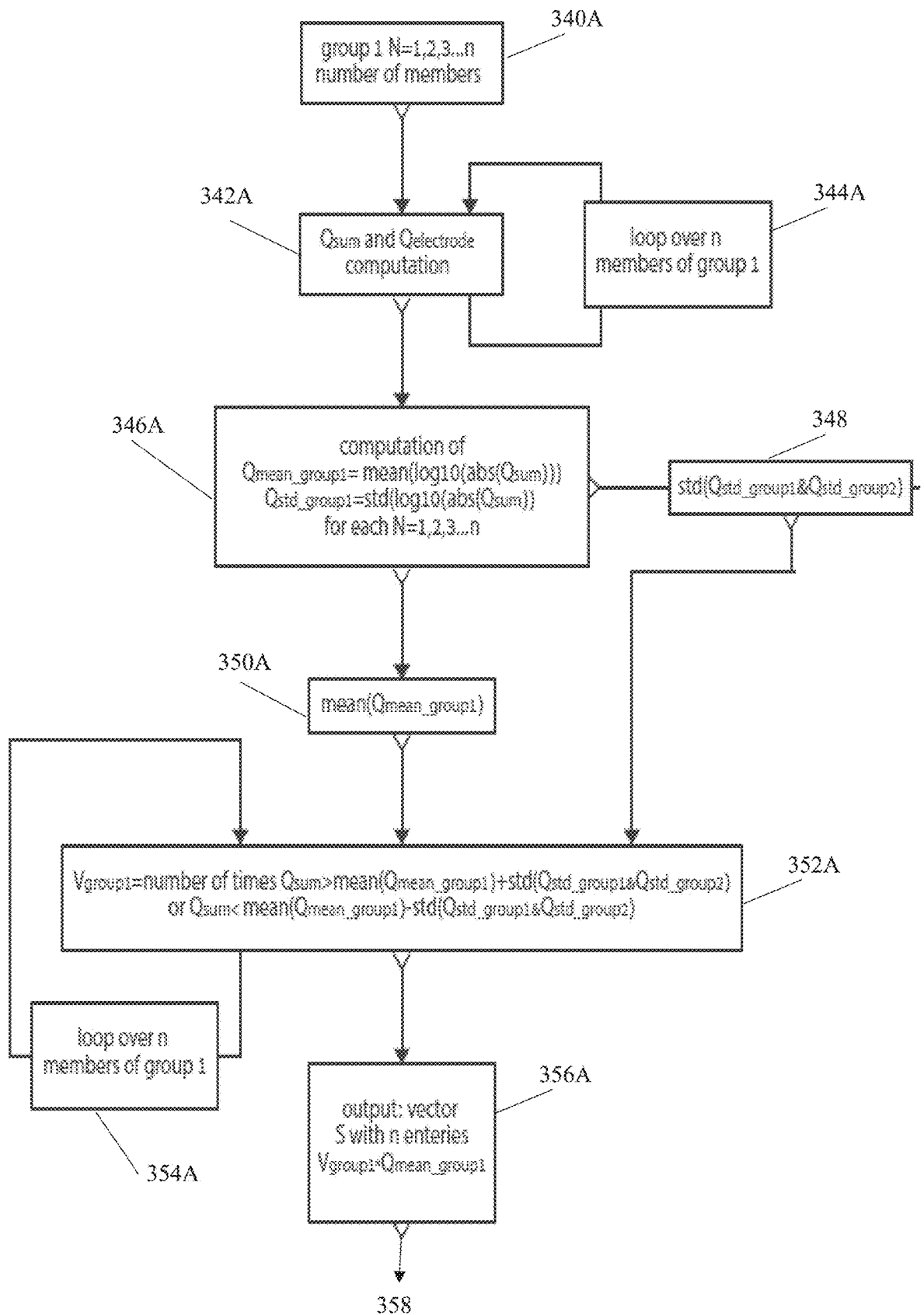
Figure 3C:
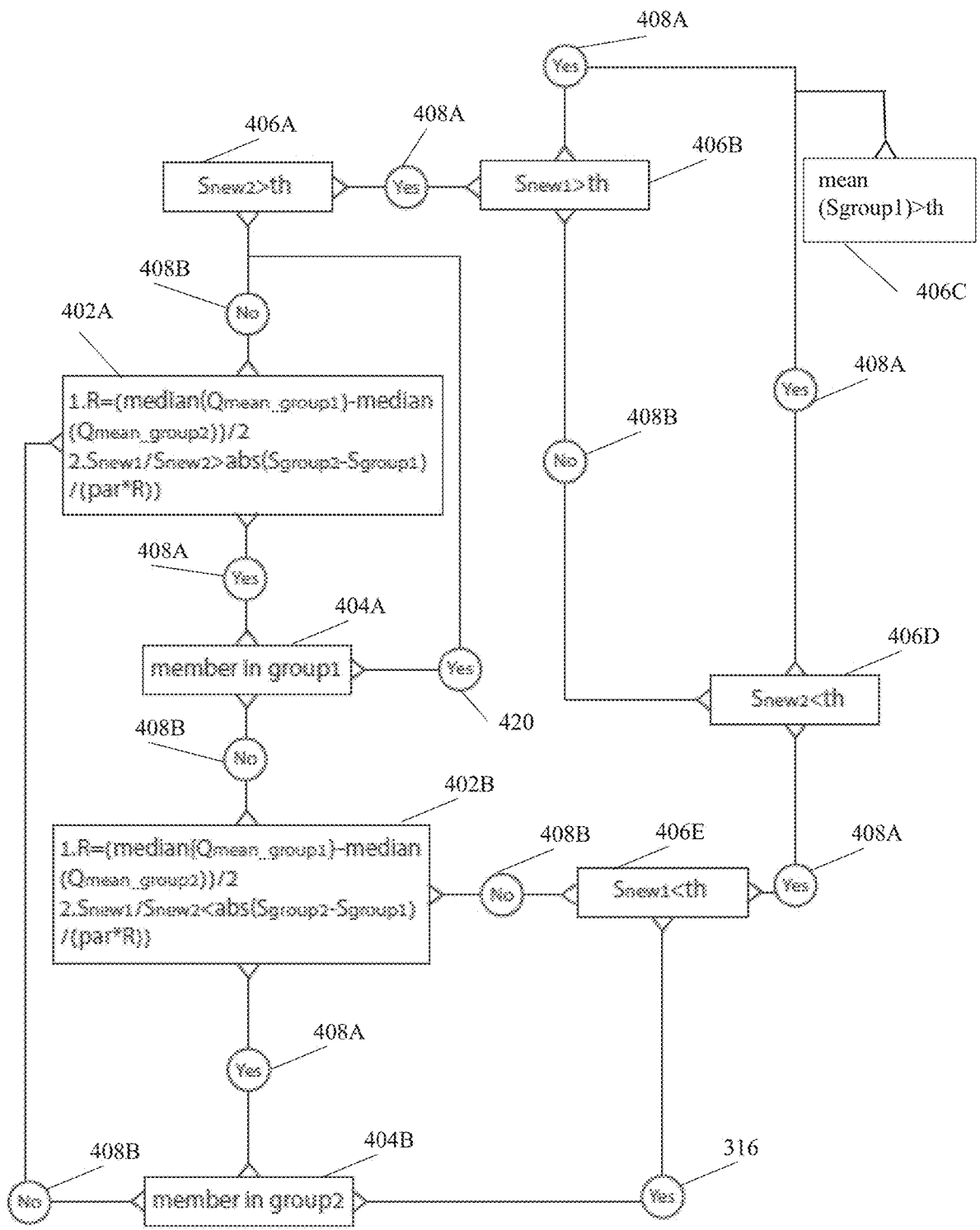

Reference is now made to FIG. 1, which is a flowchart of a method of computing a quantum potential value extracted from p-adic representation of clusters of EEG datasets obtained from EEG electrodes monitoring a head of a subject, in accordance with some embodiments of the present invention. The quantum potential value may be used for diagnosing a medical state associated with a neuro-psychiatric, as described herein and/or in the Experiment in the Examples section below. Reference is also made to FIG. 2, which is a block diagram of a system for computing a quantum potential value extracted from p-adic representation of clusters of EEG datasets obtained from EEG electrodes monitoring a head of a subject, in accordance with some embodiments of the present invention. Reference is also made to FIG. 3A-C, which are flowcharts of an exemplary method for quantum potential value from p-adic representation of EEG measurements of a subject, and/or diagnosing the medical state associated with a neuro-psychiatric disorder of the subject according to the quantum potential, in accordance with some embodiments of the present invention. Reference is also made to FIGS. 4A-9, which depict experimental results, in accordance with some embodiments of the present invention. System 200 described with reference to FIG. 2 may implement the features of the method described with reference to FIGS. 1 and/or 3A-3C, by one or more hardware processors 202 of a computing device 204 executing code instructions stored in a memory (also referred to as a program store) 206. The experimental results of FIGS. 4A-9 may be obtained using the approaches described with reference to FIGS. 1 and/or 3A-3C and/or using components of system 200 described with reference to FIG. 2.

Computing device 204 may be implemented as, for example, a client terminal, a server, a virtual machine, a virtual server, a computing cloud, a mobile device, a desktop computer, a thin client, a Smartphone, a Tablet computer, a laptop computer, a wearable computer, glasses computer, and a watch computer.

Multiple architectures of system 200 based on computing device 204 may be implemented. In an exemplary implementation of a centralized architecture, computing device 204 storing code 206A may be implemented as one or more servers (e.g., network server, web server, a computing cloud, a virtual server) that provides centralized services for computing a quantum potential value and/or diagnosing a subject according to the quantum potential value (e.g., one or more of the acts described with reference to FIG. 1) to one or more servers 218 and/or client terminals 208 over a network 210, for example, providing software as a service (SaaS) to the servers 218 and/or client terminal(s) 208, providing software services accessible using a software interface (e.g., application programming interface (API), software development kit (SDK)), providing an application for local download to the servers 218 and/or client terminal(s) 208, and/or providing functions using a remote access session to the servers 218 and/or client terminal(s) 208, such as through a web browser and/or viewing application. For example, users use client terminals 208 to access computing device 204 to provide EEG datasets sensed by EEG electrodes monitoring respective heads of subjects. In another example of a localized architecture, code 206A is obtained from computing device 204, and/or locally executed on client terminal 208 and/or on server 218. For example, a user may use code 206A executing on client terminal 208 to locally compute the quantum potential value and/or locally diagnose subjects based on computed quantum potential values. For example, each EEG lab and/or each psychiatrist installs a local copy of code 206A on their own computer to locally compute the quantum potential value and/or diagnose subjects.

Computing device 204 receives EEG dataset captured by EEG electrode(s) 212. EEG electrode(s) 212 sense EEG signals of a head of a subject. EEG electrode(s) 212 may be wet and/or dry electrodes. EEG electrode(s) 212 may be standard EEG electrodes arranged in a standard EEG configuration, for example, as used for detecting epilepsy, performing sleep studies, and the like.

EEG electrode(s) 212 may transmit captured EEG datasets (i.e., of EEG signals) to computing device 204, for example, via a direct connected (e.g., local bus and/or cable connection and/or short range wireless connection), and/or via a network 210 and a network interface 222 of computing device 204 (e.g., where EEG electrode(s) are connected via internet of things (IoT) technology and/or are located remotely from the computing device).

Network interface 222 may be implemented as, for example, a wire connection (e.g., physical port), a wireless connection (e.g., antenna), a network interface card, a wireless interface to connect to a wireless network, a physical interface for connecting to a cable for network connectivity, and/or virtual interfaces (e.g., software interface, application programming interface (API), software development kit (SDK), virtual network connection, a virtual interface implemented in software, network communication software providing higher layers of network connectivity).

Memory 206 stores code instructions executable by hardware processor(s) 202. Exemplary memories 206 include a random access memory (RAM), read-only memory (ROM), a storage device, non-volatile memory, magnetic media, semiconductor memory devices, hard drive, removable storage, and optical media (e.g., DVD, CD-ROM). For example, memory 206 may code 206A that execute one or more acts of the method described with reference to FIGS. 1 and/or 3A-3C.

Computing device 204 may include data storage device 220 for storing data, for example, EEG dataset repository 220A for storing EEG datasets captured by EEG electrode(s) 212, for example, where each record of the EEG dataset stores multiple EEG datasets obtained from multiple EEG electrodes sensing a head of a respective subject (e.g., simultaneous recordings). Data storage device 220 may store threshold repository 220B which stores different thresholds used to make different diagnoses based on the computed quantum potential value. Data storage device 220 may be implemented as, for example, a memory, a local hard-drive, a removable storage unit, an optical disk, a storage device, a virtual memory and/or as a remote server 218 and/or computing cloud (e.g., accessed over network 210).

Computing device 204 and/or client terminal(s) 208 and/or server(s) 218 include and/or are in communication with one or more physical user interfaces 224 that include a mechanism for inputting data (e.g., enter name of subject, select which disorder is being diagnosed) and/or for viewing data, for example, a display for presenting the computed quantum potential value and/or for presenting the diagnosis. Exemplary user interfaces 224 include, for example, one or more of, a touchscreen, a display, a keyboard, a mouse, and voice activated software using speakers and microphone.

Referring now back to FIG. 1, an exemplary process for computing a quantum potential value from EEG datasets obtained from EEG electrodes monitoring a head of a subject is now described. The quantum potential value may be used for diagnosing a medical state associated with a neuro-psychiatric, as described herein and/or in the Experiment in the Examples section below.

At 102, EEG datasets are accessed. each respective EEG dataset from a respective EEG electrode of a plurality of EEG electrodes monitoring a head of the subject EEG datasets (i.e., EEG measurements) are obtained from multiple EEG electrodes. Raw EEG data from about 5-30, or 10-25, or about 19 (e.g., as in the Experiment described herein), or other number of active electrodes (elec) may be transformed, for example, to European Data Format (EDF). The EEG data may be filtered to remove 50 hertz (Hz) signal. Further data may be filtered with a high pass filter of, for example, 1 Hz.

The EEG data may be collected over a sample time interval which may be continuous, for example, about 100-500 seconds, or about 300-400 seconds, or 351 seconds (as in the Experiment described herein).

At 104, the EEG datasets may be clustered into clusters, for example, using the following exemplary approach.

Optionally, multiple probability distribution functions are computed. Each respective probability distribution function may be computed for a respective EEG dataset. Clustering may be performed by clustering the probability distribution functions, for example, as described in an exemplary approach below. The p-adic representation is computed based on clusters of the distribution functions, for example, as described in an exemplary approach below.

Optionally, multiple similarity values are computed. Each respective similarity value may be indicative of similarity between a respective pair of the probability distribution functions. Each respective similarity values may be implemented as a Hellinger distance. Clustering may be performed by computing a hierarchical relationship between the pairs of distribution functions according to the similarity values, for example, as described in an exemplary approach below. The p-acid representation is computed according to the hierarchical relationship, for example, as described in an exemplary approach below. Optionally, the hierarchical relationship may be implemented as a dendrogram. The p-acid representation may be computed for each respective route through the dendrogram terminating at an edge corresponding to a certain EEG electrode, for example, as described in an exemplary approach below.

The exemplary approach for clustering EEG datasets, computing the probability distribution functions, computing the probability distribution functions, and/or computing the hierarchical relationship implemented as a dendrogram, is now described:

A moving time window may be selected, for example, about 0.5, 1, 1.5, 2 seconds, or other time values (1 second was used in the Experiment described herein).

For each time step, the following mathematical relationship is satisfied:

$$t \in \left[1 \text{ floor}\left(\frac{\text{no. of data points}}{\text{sample rate}}\right)/(\text{window duration})\right]$$

and each electrode $$elec \in [1\ 19]$$

a normalized distribution function is constructed. The electrical potential values (p, [mV]) recorded for each electrode (elec) at any given time t may be binned (0.01) and/or normalized according to the following mathematical relationship:

$$\hat{p}_{elec,t} = \frac{|p_{elec,t}|}{\max(|p_{elec,t}|)}, \hat{p}_{elec,t} \in [0 1]$$

A histogram $h_{elec,t}$ may be constructed representing an empirical probability distribution function. Alternatively or additionally, the probability distribution function itself is computed. Alternatively or additionally, other data structures may be used to represent the probability distribution function.

Multiple similarity values may be computed for pairs of EEG electrodes, where each similarity value is indicative of similarity between a respective pair of histograms and/or distribution functions. For example, for each t a pairwise Hellinger distance between all 19 $h_{elec,t}$ is computed. A hierarchical relationship between the pairs of distribution functions (and/or histograms) is computed according to the similarity values, for example, a dendrogram is constructed from the Hellinger distances.

At 106, a p-adic representation of the clusters is computed.

Optionally, the p-adic representation is implemented as 2-adic. Other values may be selected accordingly.

Multiple p-adic representation may be computed. Each respective p-adic representation may correspond to a respective (optionally one) EEG electrode. The quantum potential value is extracted (e.g., as described with reference to 108 of FIG. 1) by computing a single quantum potential value from the multiple p-adic representations.

Optionally, the p-adic representation is computed from the dendrogram. Each dendrogram may be represented in a matrix ($B_{t,patient}$) where each row ($r_{elec,t,patient}$) denotes a p-adic, optionally 2-adic, expansion of the electrode (edge) tree route, for example computed as described with reference to Murtagh, F. (2017) Data Science Foundations: Geometry and Topology of Complex Hierarchic Systems and Big Data Analytics Boca Raton, FL: CRC Press, incorporated herein by reference in its entirety.

Optionally, the p-adic representation is converted into a rational number. Each respective p-adic representations may be converted into a corresponding respective rational number. Optionally, each 2-adic expansion ($r_{elec,t,patient}$) may be converted to rational numbers by:

$$q_{elec} = \Sigma 2^{find(r_{elec,t,patient}=1)} q_{elec} \in [0\ 1]$$

A probability distribution function may be computed from the rational number. Each of multiple probability distribution functions may be computed from a corresponding rational number. For example, a probability distribution function, pdf, ρ(q) from $q_{elec}$ may be computed with kernel function of bandwidth defined by the following mathematical relationship:

$$(\max(q_{elec}) - \min(q_{elec}))/(\text{no. columns of } B_{t,patient})$$

At 108, a quantum potential value is extracted from the p-adic representation of the clusters.

The quantum potential value may be computed from the probability distribution function described with reference to 106 of FIG. 1. Each respective quantum potential value of multiple computed quantum potential values may be computed from the corresponding respective probability distribution function. Each respective quantum potential value may correspond to one of the EEG electrodes An aggregation of the quantum potential values may be computed to generate an aggregated quantum potential value, for example, using the exemplary approach described below. The aggregating of the quantum potential values may be computed by computing a mean of the quantum potential values corresponding to the EEG electrodes, for example, using the exemplary approach described below.

The quantum-potential (Qp) may be calculated, for example, according to Holland, P. (2005) Computing the wavefunction from trajectories: particle and wave pictures in quantum mechanics and their relation. Annals of Physics, 315(2), 505-531. doi:10.1016/j.aop.2004.09.008, incorporated herein by reference in its entirety, using the following relationship:

$$Qp_{t,patient} = \frac{h^2}{4m\rho}\left(\frac{1}{2\rho}\frac{\partial\rho}{\partial q}\frac{\partial\rho}{\partial q} - \frac{\partial^2\rho}{\partial q \partial q}\right)$$

where h=1 m=1 q=$q_{elec}$ q∈[0 1]. The integral of the quantum potential may be calculated for each t (and each patient) using the following mathematical relationship:

$$\int Qp_{t,patient} dq$$

For each electrode the quantum potential value may be extracted using the following mathematical relationship:

$$Q_{elec,t,patient} = Qp_{t,patient}(elec)$$

The mean of $Q_{elec,t,patient}$ across electrodes in each patient may be defined as Qme.

The a quantum potential value may be computed by extracting a time series that includes multipole quantum potential values each from a corresponding time interval of multiple time intervals during which the EEG datasets are obtained.

For example, the Qme is computed for each time interval, where the multiple Qme values may be represented as a time series. In the Experiment described below, the quantum potential time series data analysis was done with MAT-LAB® software (Mathworks, Natick, MA).

A quantum potential mean and variability score (qpmvs) may be computed by aggregating the quantum potential values of the time series, for example, as described with reference to 110 of FIG. 1.

At 110, the medical state of the subject may be diagnose. The medical state may be associated with the neuro-psychiatric disorder. The medical state may be diagnosed according to the quantum potential relative to a threshold that separates between presence of the medical state and non-presence of the medical state.

The medical state and corresponding non-presence of the medical state may be, for example, a binary outcome indicating whether the subject has a disease or does not have the disease. In another example, the medical state and corresponding non-presence of the medical state may be whether the subject has different states of the disease, such as stable disease or deteriorating disease. In yet another example, the medical state and corresponding non-presence of the medical state may be for two different diseases, where the medical state is a first disease and the non-presence of the medical state is a second disease that is different than the first disease.

In yet another example, the medical state is a prediction of likelihood of developing the disease (e.g., neuro-psychiatric disorder) in the future, and the non-presence of the medical state comprises a prediction of likelihood of not developing the disease (e.g., neuro-psychiatric disorder) in the future, where the subject does not have the disease (e.g., neuro-psychiatric disorder) at the moment. In yet another example, when the subject does have the disease at the moment, the medical state is a prediction of likelihood of developing a certain form of the disease (e.g., deterioration, complication, variant) in the future, and the non-presence of the medical state comprises a prediction of likelihood of not developing the certain form of the disease in the future.

In yet another example, the medical state is a prediction of likelihood of positively clinically significantly responding to a certain treatment for the disease (e.g., neuro-psychiatric disorder), and the non-presence of the medical state comprises a prediction of likelihood of no clinically significant response to the certain treatment for the disease (e.g., neuro-psychiatric disorder).

The medical state may be, for example: depression, schizophrenia, Alzheimer's disease (AD), and mild cognitive impairment (MCI). The non-presence of the medical state (corresponding to the medical state) may be, for example: no neuro-psychiatric disorder, and another neuro-psychiatric disorder that is different from the medical state.

In another example, the medical state is stable AD and/or stable MCI, and the non-presence of the medical state is deteriorating AD and/or deteriorating MCI.

The medical state may be diagnosed according to the aggregated quantum potential value computed, for example, as described with reference to 108 of FIG. 1.

The value of the Qme may be used to diagnose the medical state associated with the neuro-psychiatric disorder, for example, a value of the Qme computed for a new patient falling within different ranges may indicate different medical states, for example, as described in the Experiment section below.

Alternatively or additionally, for diagnosing the medical state associated with the neuro-psychiatric disorder using the quantum potential value for a new target subject, a threshold that separates between presence of the medical state and non-presence of the medical state may be computed. The threshold may be set by computing quantum potential values for two patient groups, one of which is known to have the medical state, and the other for which the medical state is not present. The threshold may then be used for new target subjects where the presence or non-presence of the medical state is unknown.

The threshold that separates between presence of the medical state and non-presence of the medical state may be set by computing multiple quantum potential values. Each quantum potential value is for one of multiple subjects associated with an indication of the medical state or an indication of non-presence of the medical state, using respective EEG datasets. The threshold is set to separate between quantum potential values of subjects associated with the indication of the medical state, and quantum potential values of subjects associated with the indication of non-presence of the medical state.

The following exemplary approach may be used for computing the threshold for comparing the two patient groups. For each patient in the two patient groups, the mean log absolute integral of the quantum potential function for all t may be calculated using the following mathematical relationship:

$$mIqp_{patient} = <(\log 10|\int Qpdq)_t|>_{patient}$$

For each patient group, a mean integral of the quantum potential function may be calculated using the following mathematical relationship:

$$mIqp_{group} = <mIqp_{patient}>_{group}$$

For each patient in the two patient groups, the standard deviation (std) log absolute integral of the quantum potential function for all t may be calculated using the following mathematical relationship:

$$sIqp_{patient} = std(\log 10|\int Qpdq)_t|)_{patient}$$

For any two patient groups to be compared, the mean of the above std may be calculated using the following mathematical relationship:

$$sIqp_{groups} = <std(\log 10|\int Qpdq)_t|)_{patient}>_{groups}$$

The quantum potential mean and variability score (qpmvs) may be derived using the following mathematical relationship:

$$qpmvs_{patient} = (<\log 10(|(\int Qpdq)_t|>_{patient})*(times(\log 10|\int Qpdq)|_{t,patient} > mIqp_{group} + sIqp_{groups} \text{ or } (\log 10|\int Qpdq|)_{t,patient} < mIqp_{group} - sIqp_{groups})$$

The threshold may be selected by performing a Receiver Operating Characteristic (Roc) analysis on the qpmvs$_{patient}$. In the Experiment described herein, such analysis was accomplished with MATLAB® software scripts.

Optionally, using a fast Fourier transformation (FFT), a spectrogram may be created for each $Q_{electrode}$ for each patient frequencies bands of $2^{-n}$ (n=1 ... 5) and a window of for example 64 seconds (as used in the Experiment described herein, although other values may be used) with for example 0.5 overlap (as used in the Experiment described herein, although other values may be used). Each patient's electrodes spectrogram (n=19 in the Experiment described herein) may be averaged (<SP$_{electrode}>_{patient,window}$) and averaged again across all patients in each group (<<SP$_{electrode}>_{patient}>_{window}$). For each frequency band each patient group (<<SP$_{electrode}>_{patient}>_{window}$) may be normalized to the maximum value of that particular band in all groups.

Pair-wise t-test and Anova statistical tests were done in the Experiment described herein with MATLAB® and PRISM softwares.

At 112, the subject may be treated for the diagnosed medical state using a treatment effective for the medical state. Exemplary treatments for neuro-psychiatric disorders include: medications (e.g., anti-psychotics, anti-depressants, anti-anxiety), psychiatric and/or psychological therapy (e.g., cognitive behavior therapy), surgery, and electroconvulsive therapy (ECT).

Optionally, the effect of treatment may be evaluated, for example, using the following exemplary approach. A first quantum potential value for the subject is computed prior to administration of a certain treatment for the neuro-psychiatric disorder. The certain treatment is administered to the subject. A second quantum potential value for the subject is computed after the administration of the certain treatment for the neuro-psychiatric disorder. A clinically significant response to the certain treatment is determined when the second quantum potential value is statistically significantly different from the first quantum potential value.

Referring now back to FIG. 3A, a flowchart depicting an exemplary method for quantum potential computation with output of the integral of the quantum potential function-Qsum and quantum potential value for each electrode-Qelectrode, for example, as described herein, is provided.

At 302, EEG datasets (e.g., recordings) are obtained from EEG electrodes, for example, at least 5 electrodes, optionally 19 electrodes.

At 304, the EEG datasets are processed. For each electrode, a high pass filter and/or bandpass filter (e.g, highpass filter above 1 Hertz (Hz)) and/or notch filters (e.g., 50/60 Hz) are applied to remove 50/60 cycle frequencies (e.g., 50 Hz).

At 306, a time window is selected, for example, 1 second, or another value.

At 308, the absolute value of time steps windows is evaluated.

At 310A, when there are time step windows which have not yet been processed, the loop in 312 is implemented.

At 312A looping is performed over the number of electrodes and looping is performed over the time step windows, by iterating 312B-C. At 312B, each time step window is normalized to the maximum absolute of data values in the current window. At 312C, for each time step window, a histogram and/or pdf is constructed from normalized data values.

Alternatively at 310A, at 310B when there are no time step windows remaining to be processed, the loop of 312 is terminated.

At 314, output of a three dimensional matrix with size (n,m,k) is provided. Where n denotes the number of electrodes, m denotes the number of time step windows, and k denotes the number of bins in the histogram and/or pdf.

At 316, a loop of features 316A-G is iterated.

At 316A, an agglomerative hierarchical cluster from pair-wise Hellinger distances between all electrode histogram and/or pdf output is performed to obtain an agglomerative hierarchical cluster tree.

At 316B, a p-acid representation matrix representing each tree is constructed.

At 316C, output of a 2 dimensional matrix denoted [A] having size (n,k) is obtained. Where n denotes the number of electrodes, and k denotes the maximal length of each electrode p-adic expansion.

At 316D, for each row denoted a in matrix A, the following is computed:

$$b = \Sigma(2)^{-(find(a==1))}$$

At 316E, a kernel distribution function is constructed from the b values computed in 316D, with a kernel smoothing function denoted K, and bandwidth denoted h. An exemplar value of the bandwidth h=(max(electrodes values)−min(electrodes values))/(k)$^2$.

At 316F, a de Broglie-Bohm quantum potential denoted Q is computed over the interval [min(b) max(b)]. Each electrode is assigned its own value $Q_{electrode}$. The integral of the de Broglie-Bohm quantum potential denoted $Q_{sum}$ is computed over the interval.

At 316G, 316A-F are iterated over m, where m denotes the number of time step windows.

Referring now back to FIG. 3B, is a flowchart depicting an exemplary method for computation of a threshold (denoted "th") that separates two groups of subjects according to quantum potential mean and/or variability score (denoted "S"), is provided. FIG. 3B also relates to computation of mean of S for each group 1 and 2, standard deviation (std) and mean of log 10(abs(Qsum)) for each group 1 and 2.

Features ending in "A" are performed for group 1, and features ending in "B" are performed for group 2.

At 340A, a first group with a certain number of members is defined. At 340B a second group with another number of members is defined. The first group may be include subjects with the medical state and the second group may include subjects with non-presence of the medical state, for example, as described herein.

At 342A, Qsum (i.e., integral of the quantum potential function) and Qelectrode (i.e., quantum potential value for each electrode) are computed for a member of group 1, for example, as described with reference to FIG. 3A. At 344A, 342A is iterated for each member of group 1, i.e., Qsum and Qelectrode are computed for each member of group 1. At 342B and 344B, Qsum and Qelectrode are computed for each member of group 2.

At 346A, the mean of the quantum potential mean and/or variability score, denoted Qmean_group1 and the standard deviation of the quantum potential mean and/or variability score denoted Qstd_group1 are computed for each subject of group 1.

Qmean_group1 is computed according to the following equation: Qmean_group1=mean(long10(abs(Qsum))).

Qsd_group1 is computed according to the following equation: Qstd_group1=std(10long(abs(Qsum))).

At 346B, the mean of the quantum potential mean and/or variability score are computed for each subject of group2, i.e., Qmean_group2 and Qstd_group2.

At 348, the standard deviation of Qstd_group1 and Qstd_group2 is computed.

At 350A, the mean of the mean value of quantum potential values computed for each subject of group 1, denoted mean(Qmean_group1), is computed.

At 350A, the mean of the mean value of quantum potential values computed for each subject of group 2, denoted mean(Qmean_group2), is computed.

At 352A, a vector is computed for a subject of group 1, according to the following equation:

$V\text{group1}$=number of times $Q\text{sum}$>mean($Q$mean_group1)+std($Q$std_group1&$Q$std_group2) or $Q$sum<mean($Q$mean_group1)−std($Q$std_group1*$Q$std_group2).

At 354A, feature 352A is computed for each subject of group 1.

At 356A, as a result of 352A and 354A, a vector denoted S with n number of entries of Vgroup1*Qmean_group1 is computed.

At 352B, a vector is computed for a subject of group 2, according to the following equation:

$V\text{group2}$=number of times $Q\text{sum}$>mean($Q$mean_group2)+std($Q$std_group1&$Q$std_group2) or $Q$sum<mean($Q$mean_group2)−std($Q$std_group1*$Q$std_group2).

At 354B, feature 352B is computed for each subject of group 2.

At 356B, as a result of 352B and 354B, a vector denoted S with m number of entries of Sgroup1=Vgroup2*Qmean_group2 is computed.

At 358, a Receiver Operating Characteristic (Roc) analysis is performed between the two groups to obtain the best threshold (th) for the above score denoted S, that separates between the two groups.

One or more of the following outputs may be provided: Sgroup1, Sgroups2, th of scores, std (Qstd_group1&Qstd_group2), mean(Qmean_group1), and mean(Qmean_group2).

Referring now back to FIG. 3C, a flowchart of an exemplary method for diagnosing a new subject, by classifying the subject as belonging to either group 1 (e.g., having the medical state, such as associated with a neuro-psychiatric disorder) or to group 2 (e.g., having the non-medical state), is provided. The classification of the new subject is based on computation of quantum potential mean and variability score of the new subject, for example, as in the flowchart described with reference to FIG. 3B and/or 3A. The subject is classified as belonging to group 1 or group 2, for example, according to the output values of the flowchart described with reference to FIG. 3B. The "Output" of the method of FIG. 3C denotes the determination to which group the new subject belongs to.

One or multiple approaches may be used to determine whether the subject is classified into group 1 (in which case the subject is diagnosed with the medical state of group 1) or into group 2 ((in which case the subject is diagnosed with the medical state of group 2, which may be a non-medical state).

402A-B represent conditions that are evaluated to determine whether the condition is met (i.e., yes 408A) or not met (i.e., no 408B), to determine whether the subject is a member of group1 404A or group2 404B.

At 402A, R is computed according the equation: R=(median(Qmean_group1)−median(Qmean_group2))/2. The following condition is evaluated to determine whether the condition is met (i.e., yes 408A) or not met (i.e., no 408B):

$S\text{new1}/S\text{new2}>\text{abs}(S\text{group2}-S\text{group1})/(\text{par}*R)$.

At 402B, R is computed according the equation: R(median(Qmean_group1)−median(Qmean_group2))/2. The following condition is evaluated to determine whether the condition is met (i.e., yes 408A) or not met (i.e., no 408B):

$S\text{new1}/S\text{new2}<\text{abs}(S\text{group2}-S\text{group1})/(\text{par}*R)$.

406A-E represent other conditions that are evaluated to determine whether the condition is met (i.e., yes 408A) or not met (i.e., no 408B), to determine whether the subject is a member of group1 404A or group2 404B.

At 406A, the condition is Snew2>th.
At 406B, the condition is Snew1>th.
At 406C, the condition is mean(Sgroup1)>th.
At 406D, the condition is Snew2<th.
At 406E, the condition is Snew1<th.

Various embodiments and aspects of the present invention as delineated hereinabove and as claimed in the claims section below find experimental and/or computational support in the following examples.

EXAMPLES

Reference is now made to the following examples, which together with the above descriptions illustrate at least some implementations of systems, methods, apparatus, and/or code instructions described herein.

Inventors conducted an experiment, which was designed and carried out following the guidelines of the Declaration of Helsinki and approved by the local Ethics Committee Rabin Medical Center, Petach Tikva Israel and Geha Mental Health Center, Petach Tikva, Israel. Patients were selected from the EEG database of the Rabin Medical Center between 2011 and 2019.

Using the online medical health records of the Rabin Medical Center all patients undergoing at least one routine EEG examination at the Rabin Medical Center were included and categorized into four separate groups according to the following criteria. Inventors included 230 patients (average age: 58.2±18.7 years; 18-91 years; 129 females). Due to the heterogeneity of the included patients including controls, all included subjects are declared herein further on as patients.

The following patients were included:

Depression: 28 patients with a primary diagnosis of major depression by the Structured Clinical Interview for DSM-IV Axis I Disorders (SCID) and at least moderate depression severity, a major depressive episode beginning before age 30, either a chronic recurrent episode or recurrent major depressive disorder (average age: 69.7±14.8 years; 33-91 years; 20 females).

Schizophrenia: 42 patients with a diagnosis of schizophrenia according to the International Classification of Diseases (ICD-10) and currently treated at the Geha Mental Health Center, Petach Tikva, Israel (average age: 41.4±16.8 years; 18-76 years; 15 females).

Cognitive impairment: 65 patients (average age: 72.9±7.2 years; 60-87 years; 31 females) with cognitive impairment. The included patients were diagnosed either with mild cognitive impairment (MCI; n=25; average age: 73.5±6.0 years; 62-85 years; 11 females) or Alzheimer's disease (AD; n=40; average age: 72.6±7.9 years; 60-87 years; 20 females) according to guidelines of the National Institute on Aging and the Alzheimer's Association (Albert et al., 2011; McKhann et al., 2011, incorporated herein by reference in their entirety).

Control: 95 control patients (average age: 52.2±16.8 years; 19-80 years; 63 females) undergoing routine EEG due to indications not related to neuro-psychiatric diseases. Each patient group listed excluded patients with a diagnosis of the other groups in addition to further neuro-psychiatric diseases which were excluded: bipolar disorder, substance abuse, psychiatric or general medical conditions requiring hospitalization, history of epilepsy or condition requiring an anticonvulsant, ECT, vagal nerve stimulation, TMS, history of traumatic brain injury (TBI), history or imaging findings of cerebrovascular diseases including ischemic and hemorrhagic stroke.

Routine Electroencephalogram (EEG) recordings were collected from all patients retrospectively. EEG was performed in a routine clinical setting and all patients included underwent EEG in the morning hours between 8 am and 1 pm using a Nihon Koden surface EEG (19-electrodes standard international 10-20 electrode placement) with a sampling frequency of 500 Hz. EEG was performed by an experienced technician.

The quantum potential value for each electrode was computed (e.g., Qme) from the quantum potential function, as described herein. The computed quantum potential enabled comparing the defined groups of patients.

Figure 4A:
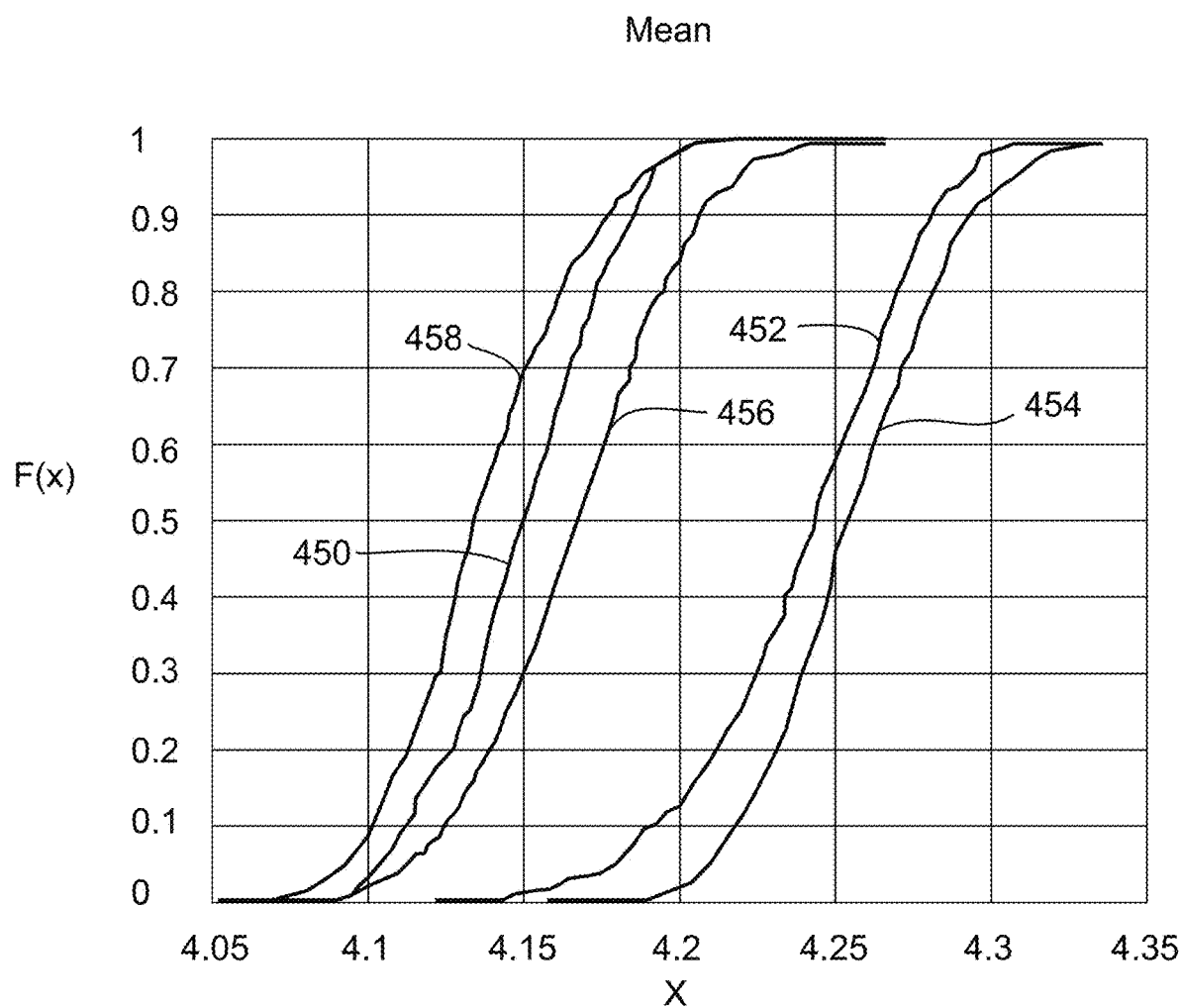
Figure 4C:
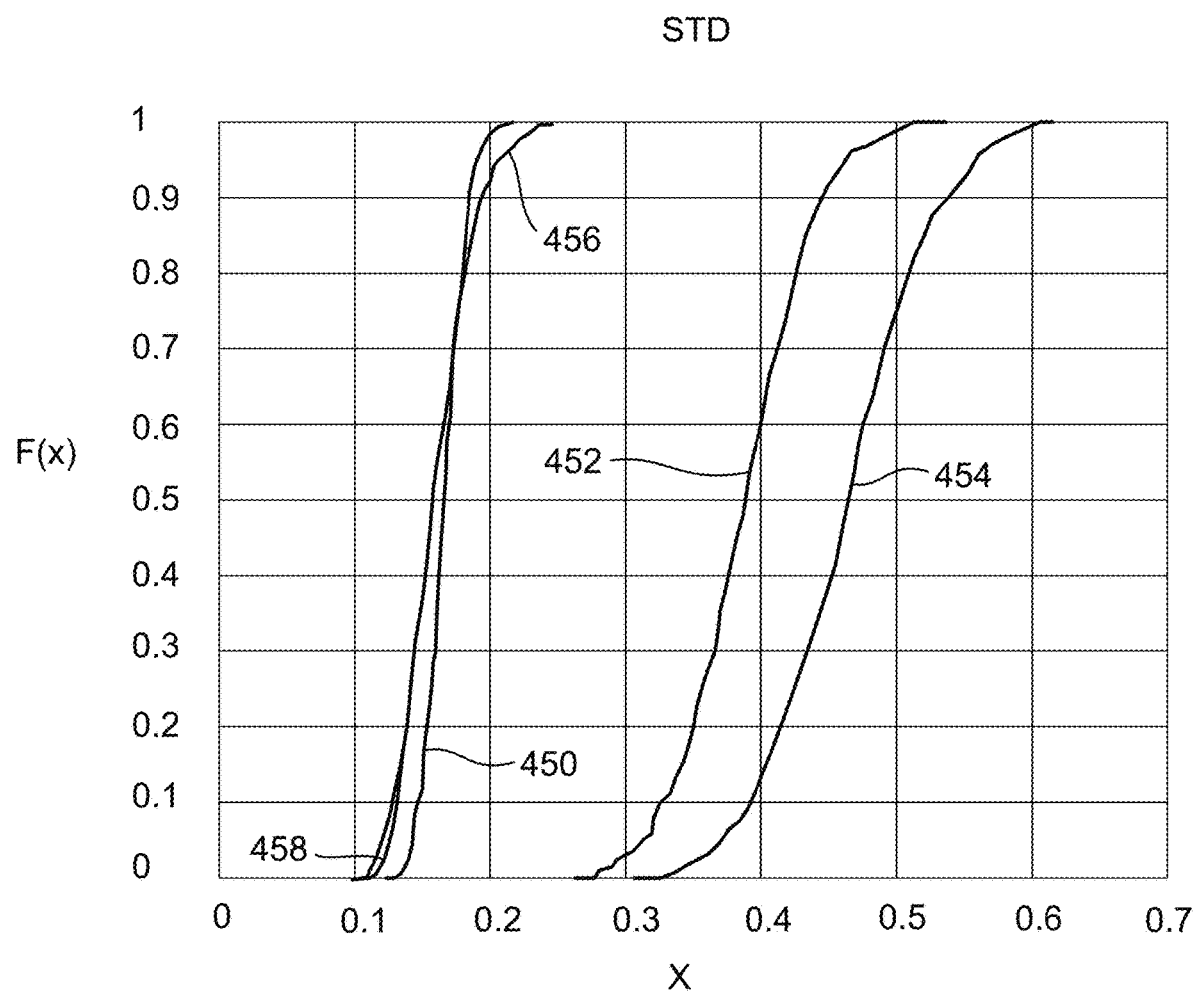

Referring now back to FIGS. 4-A-F, graphs depicting results of the experiment indicative of P-adic quantum potential (QP) differentiating between neuropsychiatric patient groups, are provided.

FIGS. 4-A and 4-B depict that the mean of the cumulative distribution function (CDF) of the mean Qme across patients was significantly different for all patient groups defined (p<1e-15; Anova). Curve 450 denotes control (i.e., no psychiatric condition), also referred to as con. Curve 452 denotes schizophrenia, also referred to as schiz. Curve 454 denotes depression, also referred to as dep. Curve 456 denotes mild cognitive impairment, also referred to as mci. Curve 458 denotes Alzheimer's, also referred to as alz. In control patients (n=95) the mean of the CDF of the mean Qme across patients was 4.1486±0.0266 and was highly significantly different from patients with depression (n=28; 4.2556±0.0298; p=3.0087e-234), schizophrenia (n=42; 4.2397±0.0351; p=1.1279e-176), AD (n=40; 4.1362±0.0289; p=5.2120e-9), and MCI (n=25; 4.1658±0.0328; p=4.7661e-14). Interestingly, the variability of the CDF denoted as standard deviation (SD) of the mean Qme across patients was also significantly different in every patient group compared to control (p<1e-15), as depicted in FIG. 4-C and FIG. 4-D.

The Qme across groups of patients (control, AD, MCI, depression, and schizophrenia) is was compared. Regarding the mean of the CDF of the mean Qme all patient groups were separated significantly from each other, as depicted in the heatmap of FIG. 4-E. The variability of the CDF of the mean Qme was significantly different and thus separating all patient groups except direct comparison of AD and MCI, as depicted in the heatmap of FIG. 4-F.

Figure 5:
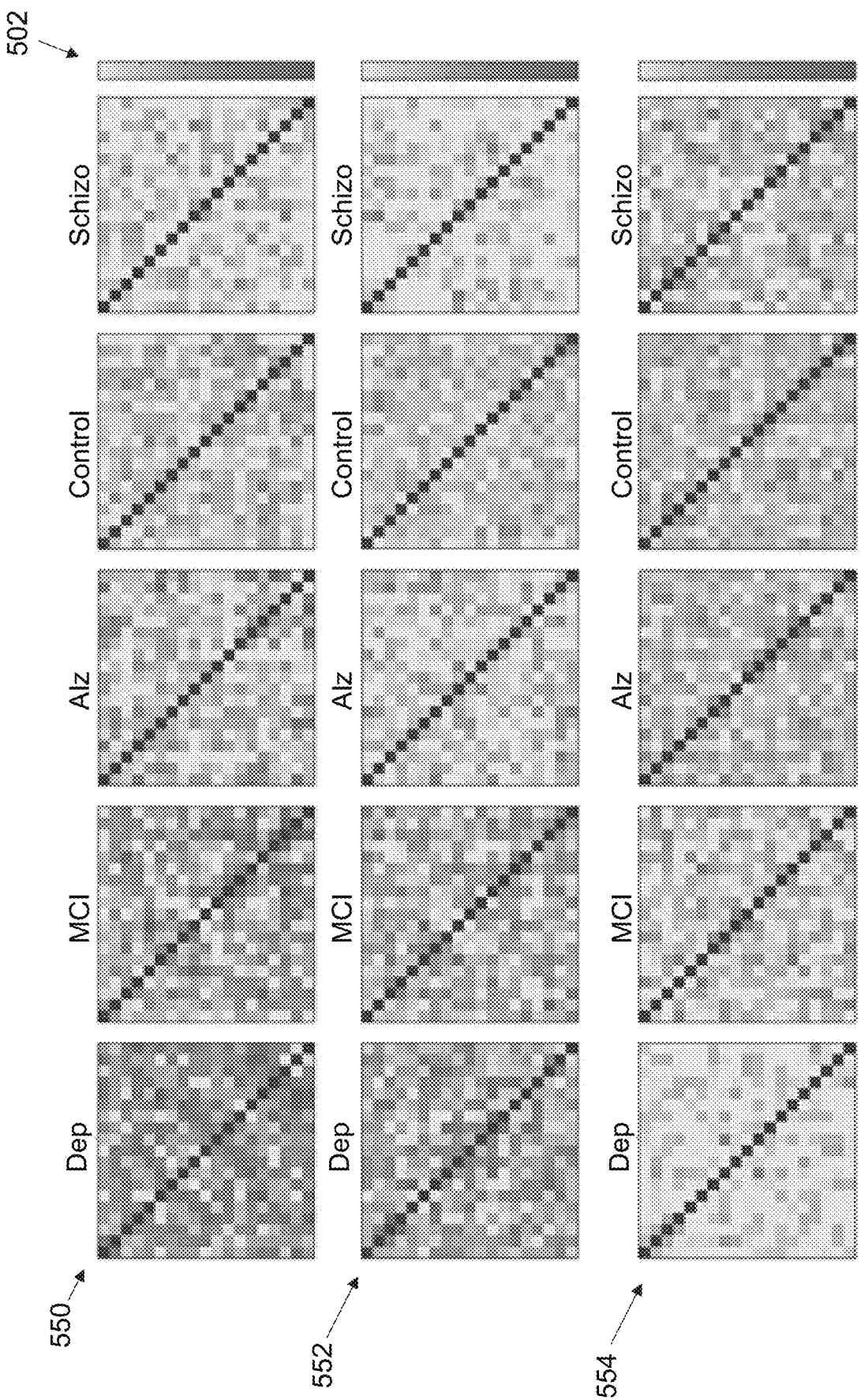
FIG. 5 includes graphs depicting additional results of the experiment indicative of QP cross correlation between patient's electrodes, in accordance with some embodiments of the present invention.
Figure 5:
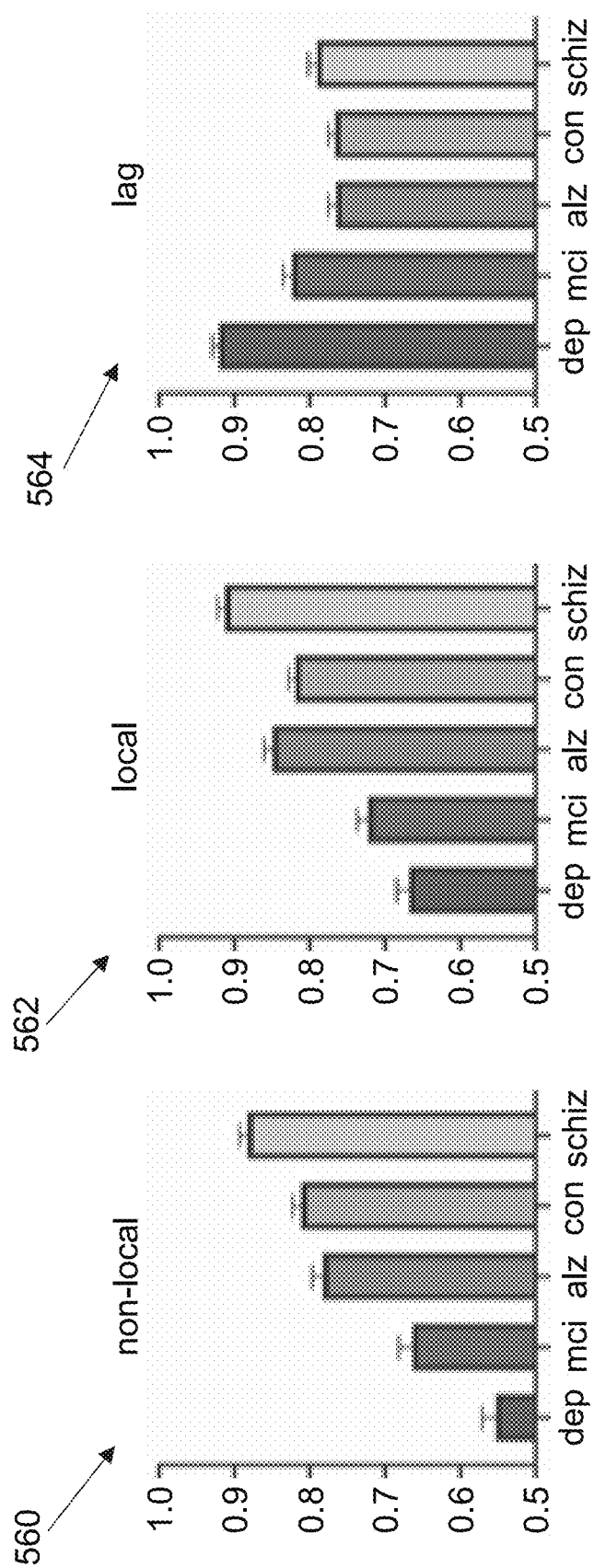

Referring now back to FIG. 5, graphs depicting additional results of the experiment indicative of QP cross correlation between patient's electrodes, are provided.

The correlation heatmaps 550, 552, and 554 of FIG. 5 are divided into squares on an x-y axis, where the first square on the x-axis (on the left bottom corner) starts at 1, and the last square on the x-axis (on the right) is 19. The first square on the y-axis (on the left bottom corner) starts at 19, decreasing to the last square on the y-axis (on the top) labelled 1. Legend 502 indicates a scale, staring at 0 (darkest) to 1 (lightest), shown in increments of 0.2.

Following the theorized non-locality of the QP according to de-broglie-bohm theory (e.g., as described with reference to Bohm, D., & Hiley, B. J. (1993). *The Undivided Universe: An Ontological Interpretation of Quantum Theory*: Routledge, incorporated herein by reference in its entirety) the pair-wise cross correlation was examined at the same time points between each of the patient's EEG electrodes QP ($Q_{elec,t,patient}$). Pair-wise cross correlation analysis between each of the patient's electrodes time series characterizes the non-local instantaneous effect between a pair of electrodes. These non-local influences are distinctively and significantly different between patient groups and represented by correlation 550 heatmap of FIG. 5 and summarized for comparison, as depicted in graph 560. To identify non-instantaneous interactions between each of the patient's EEG electrodes QP ($Q_{elec,t,patient}$) the maximal absolute correlation coefficient between each of the patient's electrodes over the whole recording time was examined. This represents the local non-instantaneous effect between pairs of electrodes as depicted in heatmap 552 and summarized for comparison as depicted in graph 562. To characterize the temporal relationship between two electrodes QP ($Q_{elec,t,patient}$) the time lag (tlag) between two EEG electrodes maximal correlation coefficient was identified as depicted in heatmap 554 and summarized for comparison in graph 556.

Figure 6:
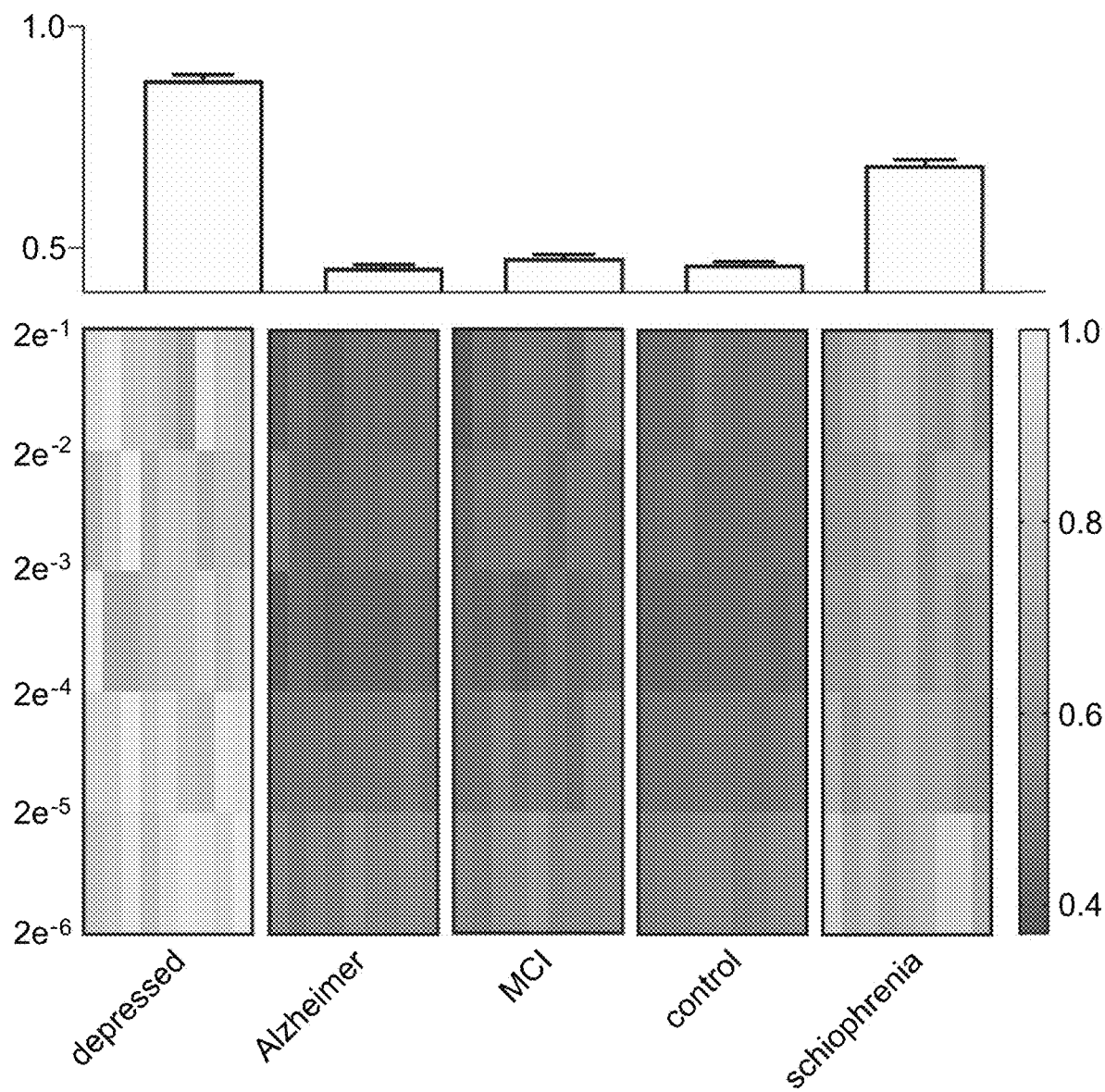
FIG. 6 includes graphs depicting yet additional results of the experiment in terms of QP power spectrum analysis of Qelectrode values, in accordance with some embodiments of the present invention.

Referring now back to FIG. 6, graphs depicting yet additional results of the experiment in terms of QP power spectrum analysis of Qelectrode values, are provided.

To characterize the QP of each patient group further, the power spectrum of $Q_{electrode}$ values of each group were compared using FFT as described herein. The normalized power density spectrum analysis was significantly different for all groups (p<0.0001; Anova). Normalized power density spectrum analysis of control patients (0.463±0.04) were significantly different from those of patients with depression (0.879±0.08; p=<0.0001) and schizophrenia (0.688±0.08; p=<0.0001). Normalized power density spectrum analysis of patients with AD (0.456±0.05) was significantly different from patients with MCI (0.478±0.05; p=0.0159) but AD and MCI did not differ from control patient groups (p=0.2525 and p=0.1014 respectively, as depicted in FIG. 6.

Figure 7:
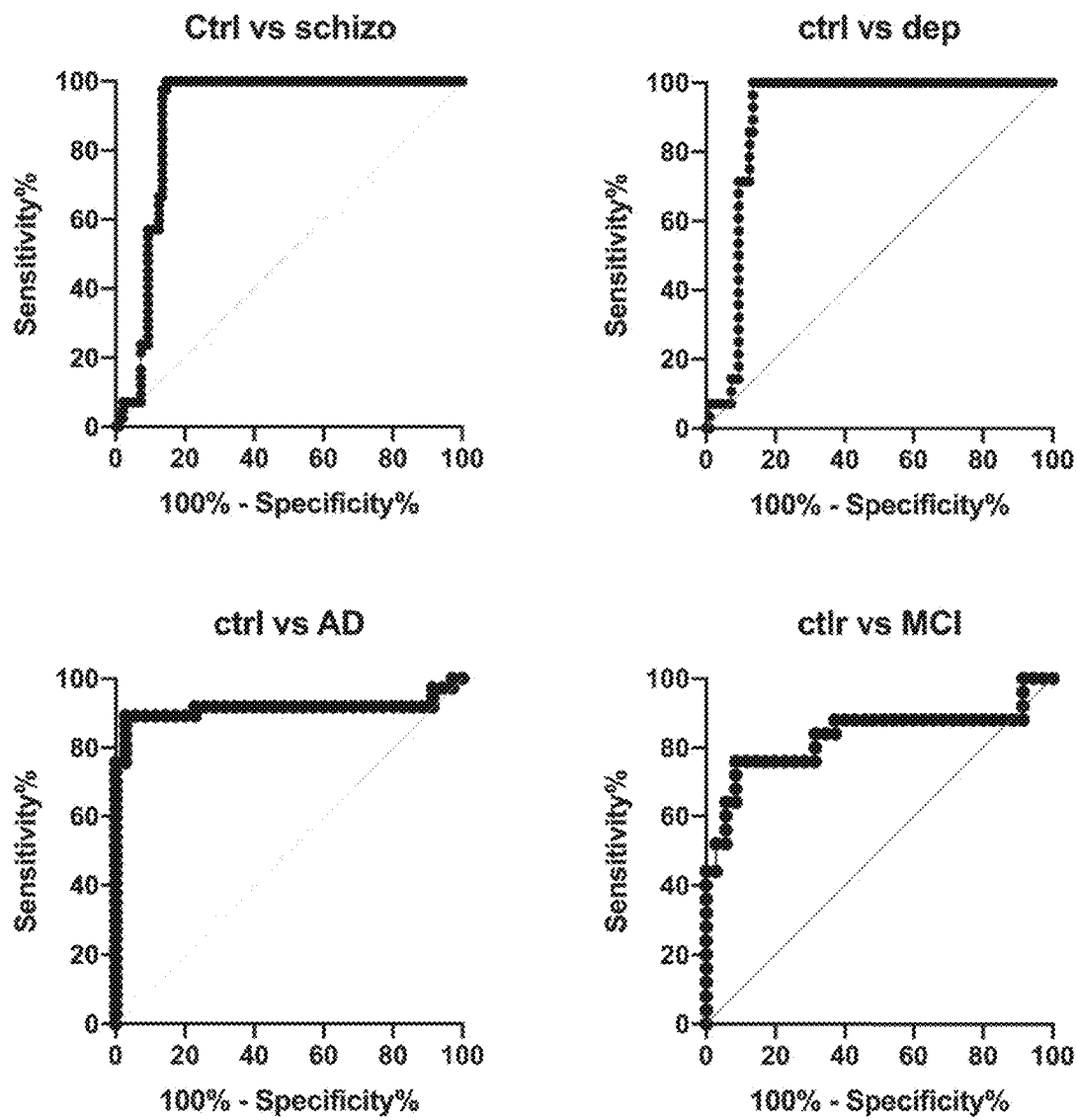
FIG. 7 includes graphs depicting yet additional results of the experiment indicative of diagnosing and/or predicting disease time course of neuro-psychiatric patients using QP, in accordance with some embodiments of the present invention.

Referring now back to FIG. 7, graphs depicting yet additional results of the experiment indicative of diagnosing and/or predicting disease time course of neuro-psychiatric patients using QP, are provided.

The quantum potential mean and variability score (qpmvs) for each patient was computed as described above. Receiver Operating Characteristic (Roc) analysis using the qpmvs of each patient shows the accuracy level of the score. Evaluation of diagnostic tests is a matter of concern in modern medicine not only for confirming the presence of disease but also to rule out the disease in healthy subjects. As the plot of sensitivity versus 1-Specifity is called receiver operating characteristic (ROC) curve and the area under the curve (AUC), as an effective measure of accuracy has been considered with a meaningful interpretation. Using the qpmvs solely based on routine EEG recordings the predictive accuracy to identify (categorize) patients with an unknown diagnosis of neuropsychiatric spectrum (healthy, depressed, schizophrenia, cognitive decline like AD and MCI) by ROC analysis and AUC was evaluated. Firstly, the control patient group was evaluated against all neuropsychiatric disease groups. The ROC analysis showed a high test accuracy when comparing control patients versus patients with schizophrenia (AUC=0.8981±0.028; p=<0.00010), control patients versus patients with depression (AUC=0.9033±0.028; p=<0.0001), control patients versus patients with AD (AUC=0.9143±0.042; p=<0.0001), and control patients versus patients with MCI (AUC=0.8309±0.06228; p=<0.0001) as depicted in FIG. 7.

Figure 8:
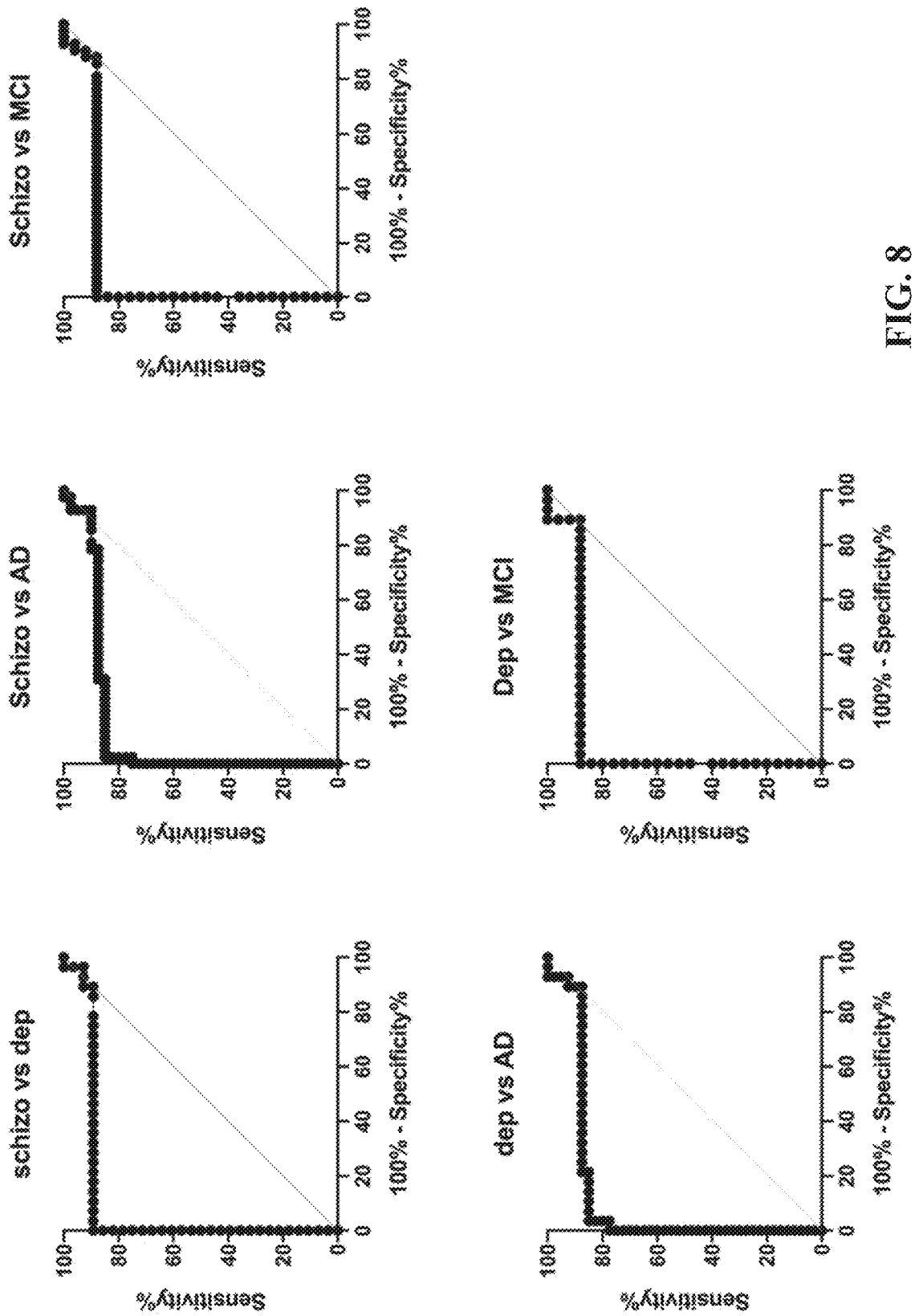
FIG. 8 includes additional graphs depicting yet additional results of the experiment indicative of diagnosing and/or predicting disease time course of neuro-psychiatric patients using QP, in accordance with some embodiments of the present invention.

Referring now back to FIG. 8, additional graphs depicting yet additional results of the experiment indicative of diagnosing and/or predicting disease time course of neuropsychiatric patients using QP, are provided.

Using the quantum potential mean and variability score (qpmvs) for each patient, Inventors discovered that patients with neuropsychiatric disorders could not only be separated accurately from the control patients but also from each other, making the qpmvs a useful diagnostic test to predict a specific diagnosis. Comparing the neuropsychiatric patient groups to each other patients with schizophrenia versus depression (AUC=0.8992±0.055; p=<0.0001), schizophrenia versus AD (AUC=0.8762±0.048; p=<0.0001), depression versus AD (AUC=0.8777±0.048; p=<0.0001), depression versus AD (AUC=0.8777±0.048; p=<0.0001), depression versus MCI (AUC=0.8929±0.058; p=<0.0001), and schizophrenia versus MCI (AUC=0.8914±0.059; p=<0.0001) as depicted in FIG. 7.

Figure 9:
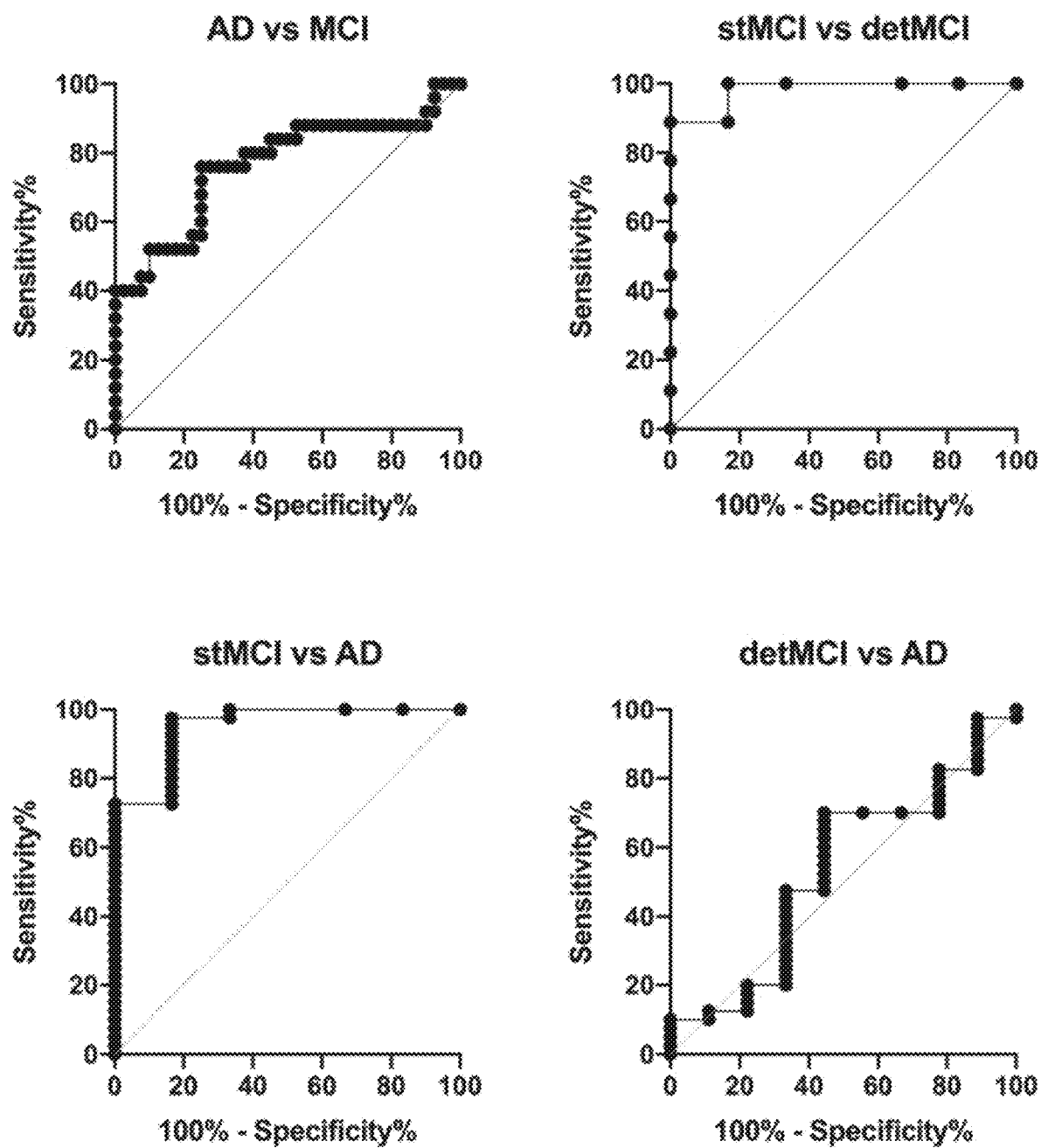
FIG. 9 includes additional graphs depicting yet additional results of the experiment indicative of diagnosing and/or predicting disease time course of neuro-psychiatric patients using QP, in accordance with some embodiments of the present invention.

Referring now back to FIG. 9, additional graphs depicting yet additional results of the experiment indicative of diagnosing and/or predicting disease time course of neuropsychiatric patients using QP, are provided.

When focusing on the subgroup of patients with cognitive decline (AD and MCI), Inventors discovered an accuracy of separation between the patient groups which was suboptimal (AUC=0.7660±0.06559; p<0.0003). The MCI patient groups were analyzed according to their disease course and separated the MCI patients in one group which showed a stable disease course (stbMCI) versus those patients with a deteriorating disease course (detMCI). The two groups did not differ in age or cognitive testing scores when first evaluated and examined by EEG recording. They were all clinically classified as MCI without any signs possibly predicting their clinical course (stbMCI versus detMCI: 74.3±4.5 years versus 73.3±5.6 years; p=0.72; 28.6±1.2 MMSE versus 27.2±1.6 MMSE; p=0.09). Using the qpmvs the stbMCI and detMCI were separated highly accurately (AUC=0.9815±0.029; p=<0.0022). The MCI patients with a stable disease course showed clear separation from patients with AD using the qpmvs (AUC=0.950±0.044; p=<0.0004) while those deteriorating did not separate from the AD patients (AUC=0.533±0.112; p=0.756) as shown in FIG. 9.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant EEG datasets will be developed and the scope of the term EEG dataset is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of diagnosing a neuro-psychiatric disorder in a subject, comprising:
   receiving a plurality of EEG datasets, each respective EEG dataset from a respective single EEG electrode of a plurality of EEG electrodes monitoring a head of the subject;
   clustering the plurality of EEG datasets into a plurality of clusters;
   computing a plurality of p-adic numbers of the plurality of clusters, wherein a respective p-adic number of the plurality of p-adic numbers corresponds to one of the respective EEG datasets,
   wherein p-adic comprises 2-adic;
   extracting a time series including a plurality of quantum potential values from the plurality of p-adic numbers of the plurality of clusters, each quantum potential value extracted from a corresponding time interval of a plurality of time intervals during which the plurality of EEG datasets are obtained;
   diagnosing the neuro-psychiatric disorder according to the quantum potential relative to a threshold that separates between presence of the neuro-psychiatric disorder and non-presence of the neuro-psychiatric disorder, wherein the diagnosed neuro-psychiatric disorder is selected from a group consisting of: depression, schizophrenia, Alzheimer's disease (AD), and mild cognitive impairment (MCI); and
   according to said diagnosing, treating the subject using a treatment effective for the diagnosed neuro-psychiatric disorder, wherein the treatment is selected from: antipsychotics, anti-depressants, anti-anxiety medication, psychiatric and/or psychological therapy, surgery, and electroconvulsive therapy (ECT);
   wherein the threshold is set by computing the quantum potential value for each patient in a first group of patients known to have the neuro-psychiatric disorder and for each patient in a second group of patients for which the neuro-psychiatric disorder is not present, and selecting the threshold based on a statistical analysis that separates the first group and the second group.

2. The computer implemented method of claim 1, further comprising computing a plurality of probability distribution functions each computed for one of the respective EEG dataset, wherein clustering comprises clustering the plurality of probability distribution functions, wherein the p-adic number is computed based on clusters of the probability distribution functions.

3. The computer implemented method of claim 2, further comprising computing a plurality of similarity values, each respective similarity value indicative of similarity between a respective pair of the plurality of probability distribution functions,
   wherein clustering comprises computing a hierarchical relationship between the pairs of distribution functions according to the plurality of similarity values,
   wherein the p-adic number is computed according to the hierarchical relationship.

4. The computer implemented method of claim 3, wherein each of the plurality of similarity values comprises a Hellinger distance.

5. The computer implemented method of claim 3, wherein the hierarchical relationship comprises a dendrogram, and wherein the p-adic number is computed for each of a plurality of respective routes through the dendrogram terminating at an edge corresponding to the respective EEG electrode.

6. The computer implemented method of claim 1, further comprising:
   converting each of the plurality of p-adic numbers into a corresponding respective rational number,
   wherein an expansion of each 2-adic number ($r_{elec,t,patient}$) is converted to a rational number representation of the 2-adic number by:

$$q_{elec} = \Sigma 2^{-find(r_{elec,t,patient}=1)} q_{elec} \in [0\ 1];$$

computing a plurality of probability distribution functions from the plurality of 2-adic rational number corresponding to the plurality of EEG electrodes, wherein each probability distribution function of the plurality of probability distribution functions is computed from a corresponding 2-adic rational number corresponding to the respective single EEG electrode of the plurality of EEG electrodes,
   wherein the probability distribution function, pdf, $\rho(q)$ from $q_{elec}$ is computed with a kernel function of a bandwidth defined by the following mathematical relationship:

$$(\max(q_{elec}) - \min(q_{elec}))/(\text{no. columns of } B_{t,patient});$$

wherein each respective quantum potential value is computed from the corresponding respective probability distribution function of the respective single EEG electrodes.

7. The computer implemented method of claim 6, wherein each of the plurality of quantum potential values corresponds to one of the plurality of EEG electrodes, and
   further comprising computing an aggregation of the plurality of quantum potential values to generate an aggregated quantum potential value,
   wherein the diagnosing the neuro-psychiatric disorder is according to the aggregated quantum potential value.

8. The computer implemented method of claim 7, wherein aggregating comprises computing a mean of the plurality of quantum potential values corresponding to the plurality of EEG electrodes.

9. The computer implemented method of claim 1, and further comprising:
   computing a quantum potential mean and variability score (qpmvs) by aggregating the plurality of quantum potential values of the time series,
   wherein the diagnosing the neuro-psychiatric disorder is according to the aggregated quantum potential value.

10. The computer implemented method of claim 1, wherein the neuro-psychiatric disorder comprises AD or MCI, and the AD or MCI is further selected from the group consisting of: stable AD, stable MCI, and wherein the non-presence of the neuro-psychiatric disorder is selected from the group consisting of: deteriorating AD, and deteriorating MCI.

11. The computer implemented method of claim 1, wherein presence of the neuro-psychiatric disorder further comprises predicting a likelihood of developing the neuropsychiatric disorder in the future, and non-presence of the neuro-psychiatric disorder further comprises predicting a likelihood of not developing the neuro-psychiatric disorder in the future.

12. The computer implemented method of claim 1, wherein presence of the neuro-psychiatric disorder further comprises predicting a likelihood of positively clinically significantly responding to the treatment effective for the neuro-psychiatric disorder, and non-presence of the neuro-psychiatric disorder further comprises predicting a likelihood of no clinically significant response to the treatment for the neuro-psychiatric disorder.

13. The computer implemented method of claim 1, further comprising:
- computing a first quantum potential value for the subject prior to the treating of the subject using the treatment effective for the diagnosed neuro-psychiatric disorder;
- performing the treating of the subject by administering the treatment effective for the diagnosed neuro-psychiatric disorder;
- computing a second quantum potential value for the subject after the administration of the treatment effective for the diagnosed neuro-psychiatric disorder; and
- determining a clinically significant response to the treatment when the second quantum potential value is statistically significantly different from the first quantum potential value.

* * * * *